US008850323B2

United States Patent
Okada et al.

(10) Patent No.: US 8,850,323 B2
(45) Date of Patent: Sep. 30, 2014

(54) ELECTRONIC DEVICE, CONTENT REPRODUCTION METHOD, AND PROGRAM THEREFOR

(75) Inventors: Hiroshi Okada, Kanagawa (JP); Masahiko Enari, Kanagawa (JP); Noboru Murabayashi, Saitama (JP)

(73) Assignee: Sony Corporation, Tokyo (JP)

(*) Notice: Subject to any disclaimer, the term of this patent is extended or adjusted under 35 U.S.C. 154(b) by 943 days.

(21) Appl. No.: 12/888,007

(22) Filed: Sep. 22, 2010

(65) Prior Publication Data
US 2011/0083107 A1 Apr. 7, 2011

(30) Foreign Application Priority Data
Oct. 1, 2009 (JP) ................. P2009-230000

(51) Int. Cl.
G06F 3/048 (2013.01)
G11B 27/11 (2006.01)
G11B 27/34 (2006.01)

(52) U.S. Cl.
CPC ............. *G11B 27/11* (2013.01); *G11B 27/34* (2013.01)
USPC ........... 715/736; 715/733; 715/734; 715/735; 715/737; 715/738; 715/838

(58) Field of Classification Search
CPC ........... H04N 1/00002; H04N 1/00042; H04L 43/045
USPC ......................... 715/733–738, 838
See application file for complete search history.

(56) References Cited

U.S. PATENT DOCUMENTS

| | | | | |
|---|---|---|---|---|
| 6,363,434 | B1 * | 3/2002 | Eytchison | 719/313 |
| 7,577,908 | B2 * | 8/2009 | Frazier et al. | 715/736 |
| 8,078,695 | B2 * | 12/2011 | Burnap | 709/219 |
| 8,215,545 | B2 * | 7/2012 | Otsu et al. | 235/382 |
| 2003/0014415 | A1 * | 1/2003 | Weiss et al. | 707/10 |
| 2003/0158932 | A1 * | 8/2003 | Machida et al. | 709/224 |
| 2007/0280633 | A1 * | 12/2007 | Nakamura et al. | 386/68 |

FOREIGN PATENT DOCUMENTS

| | | |
|---|---|---|
| JP | 2006-59329 | 3/2006 |
| JP | 2006-330829 | 12/2006 |

* cited by examiner

*Primary Examiner* — Amy Ng
*Assistant Examiner* — Sajeda Muhebbullah
(74) *Attorney, Agent, or Firm* — Sherr & Jiang, PLLC

(57) ABSTRACT

An electronic device includes: a communication unit to connect to a different device on a network, the different device storing contents; an output unit to connect to a display apparatus; a control unit; an operation input unit; and a reproduction unit. The control unit searches for contents stored in the different device on the network, generates a list of thumbnail images indicating the searched contents, estimates an error rate when each of the contents is received and reproduced, and outputs the list to the display apparatus, the control unit changing a state of each of the thumbnail images in the list according to the estimated error rate. The operation input unit receives reproduction instruction operation with respect to the content indicated by each of the thumbnail images. The reproduction unit receives the content, which is subjected to the reproduction instruction operation, from the different device, and reproduce the content.

15 Claims, 23 Drawing Sheets

| 73 | Operating data | Operating mode | In a case where processing is possible | In a case where processing is impossible |
|---|---|---|---|---|
| Operation | m1 | Video and audio display output | 1 | 0 |
| | m2 | Normal reproduction | 1 | 0 |
| | m3 | Digest reproduction | 1 | 0 |
| | m4 | Automatic editing | 1 | 0 |
| | m5 | Content accumulation (recording) | 1 | 0 |
| | m6 | Content capture (camera function) | 1 | 0 |
| | m7 | — | — | — |
| | ----- | ----- | ----- | ----- |
| | m16 | — | — | — |

FIG.7

| | Processing data | Processing function | In a case where processing is possible | In a case where processing is impossible |
|---|---|---|---|---|
| Image feature | g1 | Face detection | 1 | 0 |
| | g2 | Ticker detection | 1 | 0 |
| | g3 | — | — | — |
| | g4 | — | — | — |
| Camera feature | c1 | Zoom detection | 1 | 0 |
| | c2 | Pan detection | 1 | 0 |
| | c3 | Tilt detection | 1 | 0 |
| | c4 | Hand-shake detection | 1 | 0 |
| Audio feature | a1 | Audio-peak detection | 1 | 0 |
| | a2 | Music detection | 1 | 0 |
| | a3 | Human voice detection | 1 | 0 |
| | a4 | — | — | — |

FIG.8

Allowed operation (in a case where content genre is broadcast content, specifically, news program)

| | | | m1 Video and audio display output | m2 Normal reproduction | m3 Digest reproduction | m4 Automatic editing | m5 Content accumulation (recording) | m6 Content capture (camera function) | ... |
|---|---|---|---|---|---|---|---|---|---|
| Image feature | g1 | Face detection | | | ○ | ○ | | | |
| | g2 | Ticker | | | ○ | ○ | | | |
| | g3 | — | | | | | | | |
| | g4 | — | | | | | | | |
| Camera feature | c1 | Zoom detection | | | △ | △ | | | |
| | c2 | Pan detection | | | △ | △ | | | |
| | c3 | Tilt detection | | | △ | △ | | | |
| | c4 | Hand-shake detection | | | | | | | |
| Audio feature | a1 | Audio-peak detection | | | | | | | |
| | a2 | Music detection | | | | | | | |
| | a3 | Human voice detection | | | ○ | ○ | | | |
| | a4 | — | | | | | | | |

○ : Essential for operation   △ : Not essential for operation, but necessary for higher accuracy

FIG.9

Allowed operation (in a case where content genre is broadcast content, specifically, sport program)

|  |  |  | m1<br>Video and audio display output | m2<br>Normal reproduction | m3<br>Digest reproduction | m4<br>Automatic editing | m5<br>Content accumulation (recording) | m6<br>Content capture (camera function) | ... |
|---|---|---|---|---|---|---|---|---|---|
| Image feature | g1 | Face detection |  |  | ○ | ○ |  |  |  |
|  | g2 | Ticker |  |  | △ | △ |  |  |  |
|  | g3 | — |  |  |  |  |  |  |  |
|  | g4 | — |  |  |  |  |  |  |  |
| Camera feature | c1 | Zoom detection |  |  | ○ | ○ |  |  |  |
|  | c2 | Pan detection |  |  | ○ | ○ |  |  |  |
|  | c3 | Tilt detection |  |  | ○ | ○ |  |  |  |
|  | c4 | Hand-shake detection |  |  |  |  |  |  |  |
| Audio feature | a1 | Audio-peak detection |  |  | ○ | ○ |  |  |  |
|  | a2 | Music detection |  |  |  |  |  |  |  |
|  | a3 | Human voice detection |  |  |  |  |  |  |  |
|  | a4 | — |  |  |  |  |  |  |  |

○ : Essential for operation    △ : Not essential for operation, but necessary for higher accuracy

FIG.10

Allowed operation (in a case where content genre is broadcast content, specifically, music program)

| | | | m1 Video and audio display output | m2 Normal reproduction | m3 Digest reproduction | m4 Automatic editing | m5 Content accumulation (recording) | m6 Content capture (camera function) | ...... |
|---|---|---|---|---|---|---|---|---|---|
| Image feature | g1 | Face detection | | | O | O | | | |
| | g2 | Ticker | | | △ | △ | | | |
| | g3 | – | | | | | | | |
| | g4 | – | | | | | | | |
| Camera feature | c1 | Zoom detection | | | △ | △ | | | |
| | c2 | Pan detection | | | △ | △ | | | |
| | c3 | Tilt detection | | | △ | △ | | | |
| | c4 | Hand-shake detection | | | | | | | |
| Audio feature | a1 | Audio-peak detection | | | | | | | |
| | a2 | Music detection | | | O | O | | | |
| | a3 | Human voice detection | | | O | O | | | |
| | a4 | – | | | | | | | |

O : Essential for operation   △ : Not essential for operation, but necessary for higher accuracy

FIG.11

Allowed operation (in a case where content genre is private content)

| | | | m1<br>Video and audio display output | m2<br>Normal reproduction | m3<br>Digest reproduction | m4<br>Automatic editing | m5<br>Content accumulation (recording) | m6<br>Content capture (camera function) | ...... |
|---|---|---|---|---|---|---|---|---|---|
| Image feature | g1 | Face detection | | | ○ | ○ | | | |
| | g2 | Ticker | | | | | | | |
| | g3 | — | | | | | | | |
| | g4 | — | | | | | | | |
| Camera feature | c1 | Zoom detection | | | ○ | ○ | | | |
| | c2 | Pan detection | | | ○ | ○ | | | |
| | c3 | Tilt detection | | | ○ | ○ | | | |
| | c4 | Hand-shake detection | | | ○ | ○ | | | |
| Audio feature | a1 | Audio-peak detection | | | | | | | |
| | a2 | Music detection | | | ○ | ○ | | | |
| | a3 | Human voice detection | | | | | | | |
| | a4 | — | | | | | | | |

○ : Essential for operation    △ : Not essential for operation, but necessary for higher accuracy

FIG.12

| Operating mode | Operation summary | Process |
|---|---|---|
| Automatic | Automatically inform that person, image of which is included in content, is user, the face of which is registered in device | Automatically transfer information to cache memory of device of registered user |
| Manual | Set operating mode of detecting whether or not content including image of user exists | Transfer information to cache memory of device on registered side in a case where face image is detected as a result of research |

FIG.23

ELECTRONIC DEVICE, CONTENT REPRODUCTION METHOD, AND PROGRAM THEREFOR

BACKGROUND OF THE INVENTION

1. Field of the Invention

The present invention relates to an electronic device capable of reproducing a content stored in a different device over a network, a content reproduction method in the electronic device, and a program therefor.

2. Description of the Related Art

In related art, in a domestic AV (Audio-Visual) network system, for example, a device located in a room can be used to reproduce contents stored in a different device located in a different room without making a user conscious of a place where the contents are stored.

In a case where the contents are reproduced over the network as described above, it may be difficult or may be impossible to reproduce the contents in some traffic condition of the network. However, the user of the device on a reproduction side is not allowed to judge whether or not each of the contents can be reproduced while grasping the traffic condition. Therefore, it is often for the user to know, only after the user tries to reproduce the content, that the content is incapable of being reproduced.

Japanese Patent Application Laid-open No. 2006-330829 discloses a reproduction apparatus for displaying information together with a content. In this case, the information serves to cause, when the reproduction apparatus is being supplied with the content from a different device, the user to recognize whether or not a streaming state of the content is good. Specifically, in Japanese Patent Application Laid-open No. 2006-330829, in a case where the streaming state is good, a circular arrow-like mark being rotated at high speed is displayed, for example. Further, there is also disclosed that the color of the above-mentioned mark may be varied correspondingly to the streaming state.

Further, Japanese Patent Application Laid-open No. 2006-059329 discloses a content-processing apparatus for determining whether or not a content can be reproduced in terms of copyright management, and creating a list of title information of contents in such a manner that the title information of the contents determined as being irreproducible is capable of being distinguished from the title information of the contents determined as being reproducible. Specifically, in Japanese Patent Application Laid-open No. 2006-059329, in the list, an icon of an x-mark is added to the title of the irreproducible content, or the titles of the reproducible contents and the titles of the irreproducible contents are displayed in areas separate from each other.

SUMMARY OF THE INVENTION

However, in the technique described in Japanese Patent Application Laid-open No. 2006-330829, streaming of the content is started before the streaming state is displayed with the mark, and hence the state of the content is incapable of being grasped before the content is reproduced. Therefore, it is conceivable that, only after the user starts streaming of the content, the user recognizes that the state of the content is bad and is forced to stop reproducing the content.

Further, in the technique described in Japanese Patent Application Laid-open No. 2006-059329, whether or not the content can be reproduced is displayed through marking or separation of the areas in the list of the titles, and hence the user can recognize whether or not the content can be reproduced before the content is reproduced. However, the user has to check the marks in addition to the titles and to check a plurality of areas, and hence a procedure to be performed before the content is reproduced is complicated, which leads to a lack in intuitiveness.

In view of the circumstances as described above, there is a need for an electronic device, a content reproduction method in the electronic device, and a program therefor that are capable of causing the user to intuitively grasp whether or not a content can be smoothly reproduced correspondingly to the traffic condition of the network.

According to an embodiment of the present invention, there is provided an electronic device including: a communication unit to connect to a different device on a network, the different device storing contents; an output unit to connect to a display apparatus; a control unit to search for, through the communication unit, contents stored in the different device, to generate a list of thumbnail images indicating the searched contents, to estimate, through the communication unit, based on a traffic condition of the network, an error rate when each of the contents is received and reproduced, and to output the list through the output unit to the display apparatus, the control unit changing a state of each of the thumbnail images in the list according to the estimated error rate; an operation input unit to receive, from the user, reproduction instruction operation with respect to a content indicated by each of the thumbnail images; and a reproduction unit to receive, in response to the reproduction instruction operation, the content, which is subjected to the reproduction instruction operation, through the communication unit from the different device, and reproduce the content.

With this configuration, the electronic device is allowed to cause the user to intuitively grasp whether or not the content corresponding to each of the thumbnail images can be smoothly reproduced, through changing the state of the thumbnail image in the list according to the estimated error rate when reproducing the content. Therefore, the electronic device is allowed to prevent such a condition that the user feels a feeling of discomfort caused when the user reproduces the content, which is incapable of being smoothly reproduced due to a bad traffic condition. Here, changing the state of the image means increasing a degree of shadow (gray) in the image or decreasing the intensity or the lightness of the image as the traffic condition becomes deteriorated, for example. Further, the above-mentioned content may be one recorded on a portable recording medium such as an optical disc (BD, DVD) inserted in a disk drive of the different device.

The control unit may update the list through the output unit in such a manner that, when a new content is stored in the different device, a thumbnail image indicating the newly stored content is displayed in the list, or in such a manner that, when a content stored in the different device is deleted, a thumbnail image indicating the deleted content is deleted from the list.

With this, the electronic device is allowed to inform the user, immediately after the content is added or deleted in the different device, that the content is added or deleted in the different device. In this manner, the user is allowed to immediately reproduce the added content, or to be prevented from mistakenly instructing to reproduce the deleted content.

When it is estimated that the error rate of the content decreases due to improvement in the traffic condition, the control unit may change, through the output unit, the state of each of the thumbnail images and causes the display apparatus to display a mark indicating the decrease of the error rate in the list.

With this, the electronic device is allowed, in a case where it is estimated that the traffic condition is improved and the error rate decreases, to reproduce the content in such a manner that the electronic device reliably causes the user to grasp that the content is capable of being smoothly reproduced due to the above-mentioned change of condition.

In this case, the operation input unit may receive, from the user, operation of selecting a content which the user wants to reproduce among the contents indicated by the thumbnails. In this case, the control unit may cause the display apparatus to display the mark regarding the selected content among the contents each having the error rate estimated to decrease.

With this, the electronic device is allowed to display the mark only with respect to the content which the user wants to reproduce, to thereby inform the user of information for necessary for the user and remove unnecessary information (mark).

The above-mentioned electronic device may further include a storage unit to store the contents. In this case, the control unit may generate a list including thumbnail images indicating the contents stored in the storage unit and the thumbnail images indicating the contents stored in the different device.

With this, the electronic device is allowed to display, in the list, not only the content stored in the different device on the network, but also the content stored in the electronic device itself. Therefore, the user can intuitively select and reproduce the content without making the user conscious of whether the content is the content stored in the electronic device itself or the content stored in the different device.

According to another embodiment of the present invention, there is provided a content reproduction method including: searching for contents stored in a different device on a network; generating a list of thumbnail images indicating the searched contents; estimating, based on a traffic condition of the network, an error rate when each of the contents is received and reproduced; outputting the list to a display apparatus, the control unit changing a state of each of the thumbnail images in the list according to the estimated error rate; receiving, from a user, reproduction instruction operation with respect to a content indicated by each of the thumbnail images; and receiving, in response to the reproduction instruction operation, the content, which is subjected to the reproduction instruction operation, from the different device, and reproducing the content.

According to still another embodiment of the present invention, there is provided a program for executing: searching for contents stored in a different device on a network; generating a list of thumbnail images indicating the searched contents; estimating, based on a traffic condition of the network, an error rate when each of the contents is received and reproduced; outputting the list to a display apparatus, the control unit changing a state of each of the thumbnail images in the list according to the estimated error rate; receiving, from a user, reproduction instruction operation with respect to a content indicated by each of the thumbnail images; and receiving, in response to the reproduction instruction operation, the content, which is subjected to the reproduction instruction operation, from the different device, and reproducing the content.

As described above, according to the embodiments of the present invention, it is possible to cause the user to intuitively grasp whether or not the content can be smoothly reproduced correspondingly to the traffic condition of the network.

These and other objects, features and advantages of the present invention will become more apparent in light of the following detailed description of best mode embodiments thereof, as illustrated in the accompanying drawings.

BRIEF DESCRIPTION OF DRAWINGS

FIG. 7 is a table showing the details of operation-mode data included in the test data shown in FIG. 6;

FIG. 8 is a table showing the details of processing data included in the test data shown in FIG. 6;

FIG. 9 is a table showing a process necessary for execution of each operation mode in a case where a content genre is a broadcast content, specifically, a news program in the embodiment of the present invention;

FIG. 10 is a table showing a process necessary for execution of each operation mode in a case where a content genre is a broadcast content, specifically, a sport program in the embodiment of the present invention;

FIG. 11 is a table showing a process necessary for execution of each operation mode in a case where a content genre is a broadcast content, specifically, a music program in the embodiment of the present invention;

FIG. 12 is a table showing a process necessary for execution of each operation mode in a case where a content genre is a private content in the embodiment of the present invention;

FIG. 23 is a table showing a summary of the access control process corresponding to each operation mode in the embodiment of the present invention.

DESCRIPTION OF PREFERRED EMBODIMENTS

Hereinafter, an embodiment of the present invention will be described with reference to the drawings.

[Summary of AV Network System]

Figure 1:
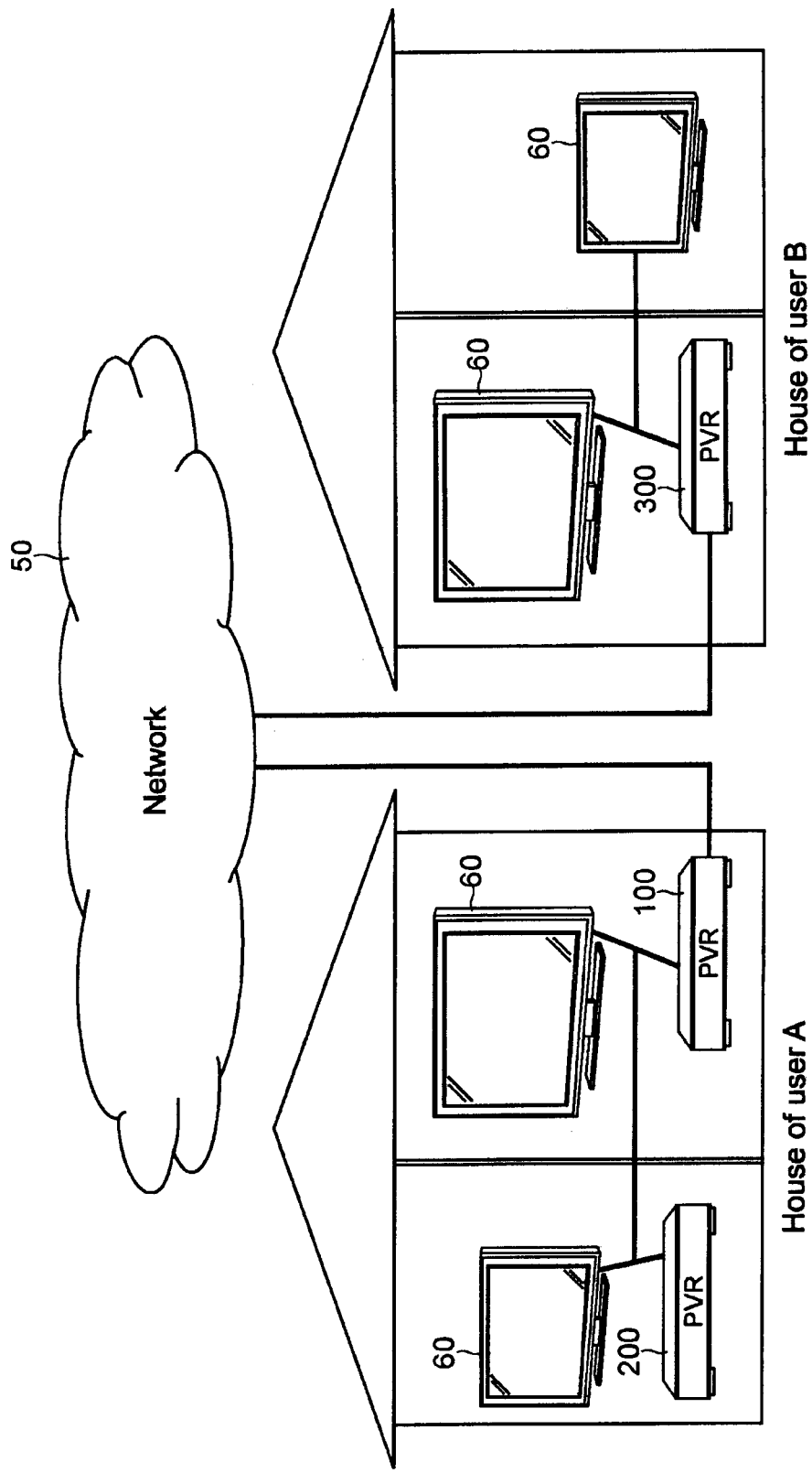
FIG. 1 is a view schematically showing an example of an AV (Audio-Visual) network system assumed in an embodiment of the present invention.

FIG. 1 is a view schematically showing an example of an AV network system assumed in the embodiment of the present invention.

As shown in FIG. 1, in the AV network system, for example, devices placed in houses (A's house and B's house) are connected to each other over a network 50 such as an Internet network. For example, in the A's house, there are placed two PVRs (Personal Video Recorders) 100 and 200 and two TVs 60. The TVs 60 are respectively connected to the PVRs 100 and 200. In this case, the PVR 100 and one TV 60 are placed in a room different from a room in which the PVR 200 and the other TV 60 are placed. Further, for example, in the B's house, there are placed one PVR 300 and two TVs 60 connected to the PVR 300. In this case, the PVR 300 and one TV 60 are together placed in a room different from a room in which the other TV 60 is placed.

In FIG. 1, there is shown an example in which the four devices placed in the A's house and the three devices placed in the B's house are connected to each other over the network 50. However, it is needless to say that the number and the type of devices placed in each of the houses are not limited thereto, and devices placed in houses other than the A's house and the B's house can be also connected to the network 50. In the following, the description may be made on assumption that the devices other than the devices shown in FIG. 1 are connected to the network 50.

In the above-mentioned configuration, the devices placed in the A's house and the devices placed in the B's house are mutually accessible over the network 50 in a case where a predetermined authentication is performed. Therefore, for example, B can access, through the PVR 300 located in the B's house over the network 50, the PVRs 100 and 200 placed in the A's house, to thereby view contents stored in the PVRs 100 and 200.

In this case, among the PVRs 100, 200, and 300, the PVR 100 has a function of generating meta-data for content editing, specific reproduction such as digest reproduction, content classification, and the like. Meanwhile, the PVRs 200 and 300 do not have the above-mentioned function. Therefore, even in a case where, for example, B wants to perform, in the B's house, specific reproduction or classification of the contents stored in the PVR 200, the PVR 300 is incapable of being used to perform the specific reproduction or the classification.

In this regards, in this embodiment, the device having no meta-data generation function for contents like the PVR 300 is allowed to cause a different device on the network 50 to generate the meta-data, the different device having the meta-data generation function like the PVR 100.

[Hardware Configuration of PVR]

Figure 2:
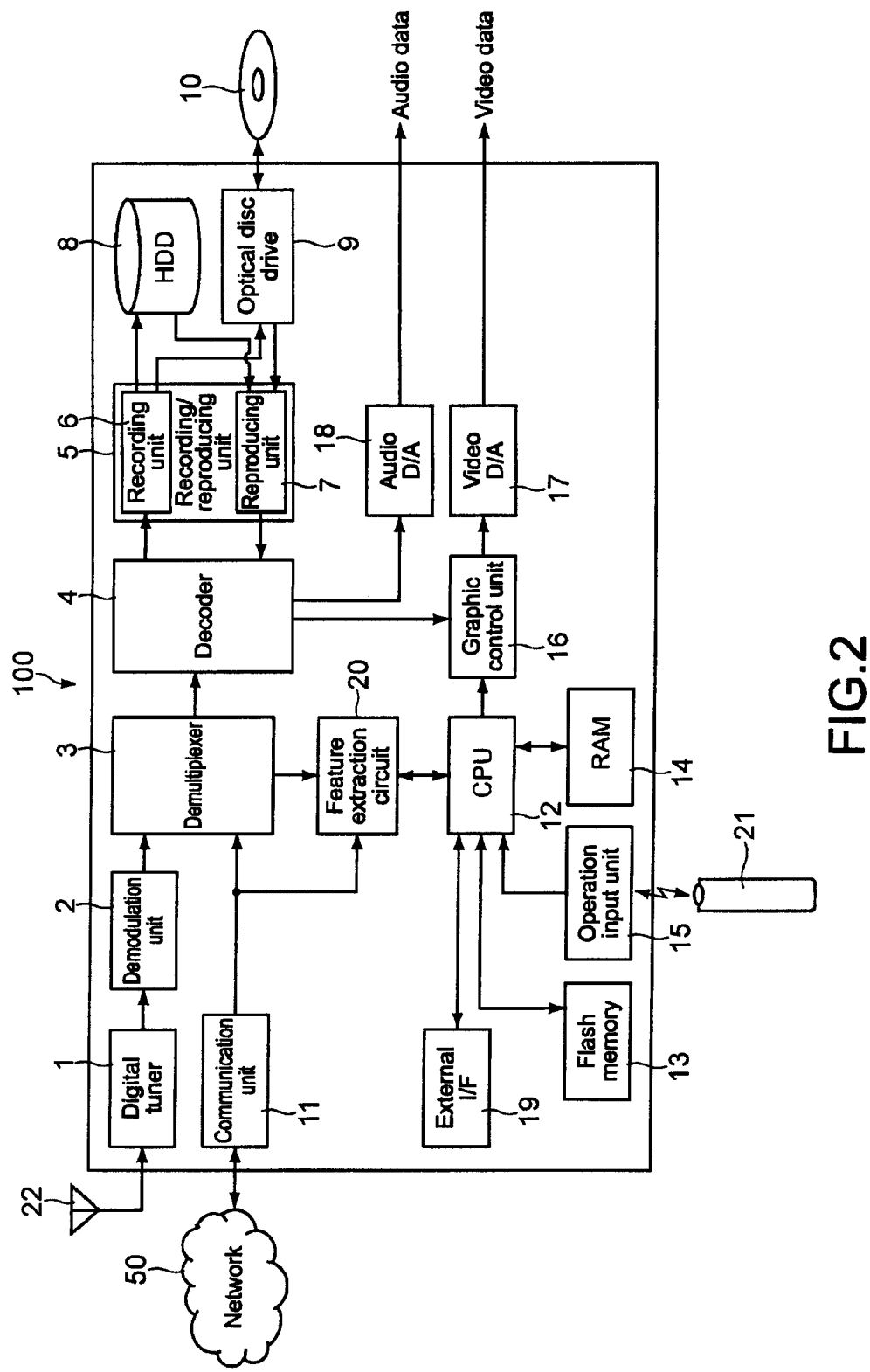
FIG. 2 is a view showing a hardware configuration of a PVR having a meta-data generation function for contents in the embodiment of the present invention.

FIG. 2 is a view showing a hardware configuration of the PVR 100 having a meta-data generation function. As shown in FIG. 2, the PVR 100 includes a digital tuner 1, a demodulation unit 2, a demultiplexer 3, a decoder 4, a recording/reproducing unit 5, an HDD (Hard Disk Drive) 8, an optical disc drive 9, and a communication unit 11. Further, the PVR 100 includes a CPU (Central Processing Unit) 12, a flash memory 13, and a RAM (Random Access Memory) 14. In addition, the PVR 100 includes an operation input unit 15, a graphic control unit 16, a video D/A (Digital/Analog) converter 17, an audio D/A (Digital/Analog) converter 18, an external interface 19, and a feature extraction circuit 20.

The digital tuner 1 selects, under the control of the CPU 12, a certain channel in digital broadcasting via an antenna 22, and receives a broadcast signal including data of a program. Although the broadcast signal is, for example, an MPEG stream encoded in MPEG-2 TS format (TS: Transport Stream), it is not limited to this format. The demodulation unit 2 demodulates the modulated broadcast signal.

The demultiplexer 3 demultiplexer the multiplexed broadcast signal into signals including a video signal, an audio signal, a closed-caption signal, a SI (Service Information) signal, and the like. Then, the demultiplexer 3 supplies the above-mentioned signals to the decoder 4. Further, the demultiplexer 3 is capable of supplying the signals, which are demultiplexed as described above before decoding, also to the feature extraction circuit 20. The SI signal serves to transmit data and the like for displaying EPG (Electronic Program Guide) information. The EPG information is used to determine the genre of the content as described later.

The decoder 4 decodes the video signal, the audio signal, the closed-caption signal, and the SI signal, which are demultiplexed by the demultiplexer 3. The decoded signals are supplied to the recording/reproducing unit 5.

The recording/reproducing unit 5 includes a recording unit 6 and a reproducing unit 7. When a video signal and an audio signal are decoded by the decoder 4 and are input into the recording unit 6, the recording unit 6 temporarily accumulates the video signal and the audio signal, and outputs the video signal and the audio signal to the HDD 8 and the optical disc drive 9 while controlling a timing and a data amount thereof, so that the HDD 8 and the optical disc drive 9 records the video signal and the audio signal. Further, the recording unit 6 is also capable of reading a content recorded in the HDD 8 and outputting the content to the optical disc drive 9 so that the optical disc drive 9 records the content on an optical disc 10. The reproducing unit 7 reads the video signal and the audio signal for a video content, which is recorded in the HDD 8 or on the optical disc 10, and outputs the video signal and the audio signal to the decoder 4 while controlling a timing and a data amount thereof. In this manner, the video signal and the audio signal are reproduced.

The HDD 8 records, in a built-in hard disc, a program received through the digital tuner 1 and various contents received through the communication unit 11 over the network 50. When the stored contents are reproduced, the HDD 8 reads data thereof from the hard disc, and outputs the data to the recording/reproducing unit 5.

Further, there is a case where the HDD 8 stores various programs, other data, and the like. When the various programs and the other data are executed and referred to, the various programs and the other data are read from the HDD 8 in response to an instruction sent from the CPU 12, and are deployed in a RAM 14.

The optical disc drive 9 is, similarly to the HDD 8, capable of recording various data of a program content and the like on the mounted optical disc 10 and of reading the recorded data. Further, the above-mentioned various programs may be recorded on a portable recording medium such as the optical disc 10 and may be installed through the optical disc drive 9 into the PVR 100.

The communication unit 11 serves as a network interface to be connected to the network 50, for transmitting and receiving data with respect to a different device on the network 50 according to a protocol such as a TCP/IP (Transmission Control Protocol/Internet Protocol). In a case where data received by the communication unit 11 is multiplexed data, the data is supplied to the demultiplexer 3. Further, at least a part of the received data is also supplied to the feature extraction circuit 20 if necessary. The EPG information may be obtained not from the broadcast signal received by the digital tuner 1, but from the network 50 through the communication unit 11.

The external interface 19 includes, for example, an USB interface and a memory card interface. For example, the external interface 19 is connected to an external device such as a digital video camera or a digital still camera, or to a memory card, and reads data of the content and the like from the external device or the memory card.

The CPU 12 accesses the RAM 14 and the like if necessary so as to generally control processes in respective blocks of the PVR 100. In this case, the processes include a reception process of video data, a recording/reproducing process of contents, a feature extraction (meta-data generation) process, and the like.

The flash memory 13 is, for example, a NAND type flash memory serving as a nonvolatile memory in which an OS to be executed by the CPU 12 and firmware including programs, various parameters, and the like are fixedly stored. Further, the flash memory 13 stores a program operating together with the feature extraction circuit 20 during the meta-data generation process, other various programs, and various data of the above-mentioned EPG information and the like.

The RAM 14 is used as a working area for the CPU 12 or the like. The RAM 14 is a memory for temporarily storing the OS, the programs, processed data, and the like during the recording/reproducing process of contents or during the meta-data generation process.

In the operation input unit 15, various setting values and instructions according to operation by a user are input through a remote controller 21 including a plurality of keys, for example. The operation input unit 15 outputs the various setting values and the instructions to the CPU 12. It is needless to say that the operation input unit 15 may not be associated with the remote controller 21, and may include a keyboard, a mouse, switches, and the like. In this case, the keyboard and the mouse are connected to the PVR 100, and the switches are provided to the PVR 100.

The graphic control unit 16 subjects the video signal output from the decoder 4 and other video data output from the CPU 12 to a graphic process such as an OSD (On Screen Display) process. In this manner, the video signal to be displayed on a display apparatus such as the TV 60 is generated.

The video D/A converter 17 converts a digital video signal input from the above-mentioned graphic control unit 16 into an analog video signal. Then, the video D/A converter 17 outputs the analog video signal through a video output terminal and the like to the display apparatus.

The audio D/A converter 18 converts a digital audio signal input from the above-mentioned decoder 4 into an analog audio signal. Then, the audio D/A converter 18 outputs the analog audio signal through an audio output terminal and the like to the TV or the like.

The feature extraction circuit 20 extracts a predetermined video feature and a predetermined audio feature from the contents stored in the HDD 8 or from the contents stored in the different device on the network 50. Then, the feature extraction circuit 20 generates, based on the extracted features, various meta-data to be used for a specific reproduction process and a classification process for each content. Specifically, the feature extraction circuit 20 divides the video signal and the audio signal of the content into data for each predetermined time period (for each frame interval) (data segmentation process). Then, the feature extraction circuit 20 temporarily stores the above-mentioned data in the RAM 14. The feature extraction circuit 20 extracts the video feature through detecting, for example, a motion vector for the video data among the stored data. Meanwhile, the feature extraction circuit 20 extracts the audio feature through analyzing, for example, a power level for the audio data among the stored data.

The predetermined video feature includes, for example, camera features such as pan, tilt, and zoom, and image features indicating objects such as a person (face), an animal, and building. The predetermined audio feature includes, for example, a feature indicating a human voice, more specifically, a feature indicating a duration time of an audio power. Further, the meta-data includes the following meta-data: meta-data (scene feature meta-data) regarding a peak scene (key-frame) in a content, which is generated based on the camera features and the audio features; meta-data (classification meta-data) for classifying contents correspondingly to subjects in a content (based on whether or not a subject is a person); meta-data (face identification meta-data) to be used for controlling accesses to a content through identifying the face of a person in the content; and the like. The above-mentioned various meta-data will be described later in details. Further, the meta-data may be the feature data itself extracted by the above-mentioned feature extraction process.

Figure 3:
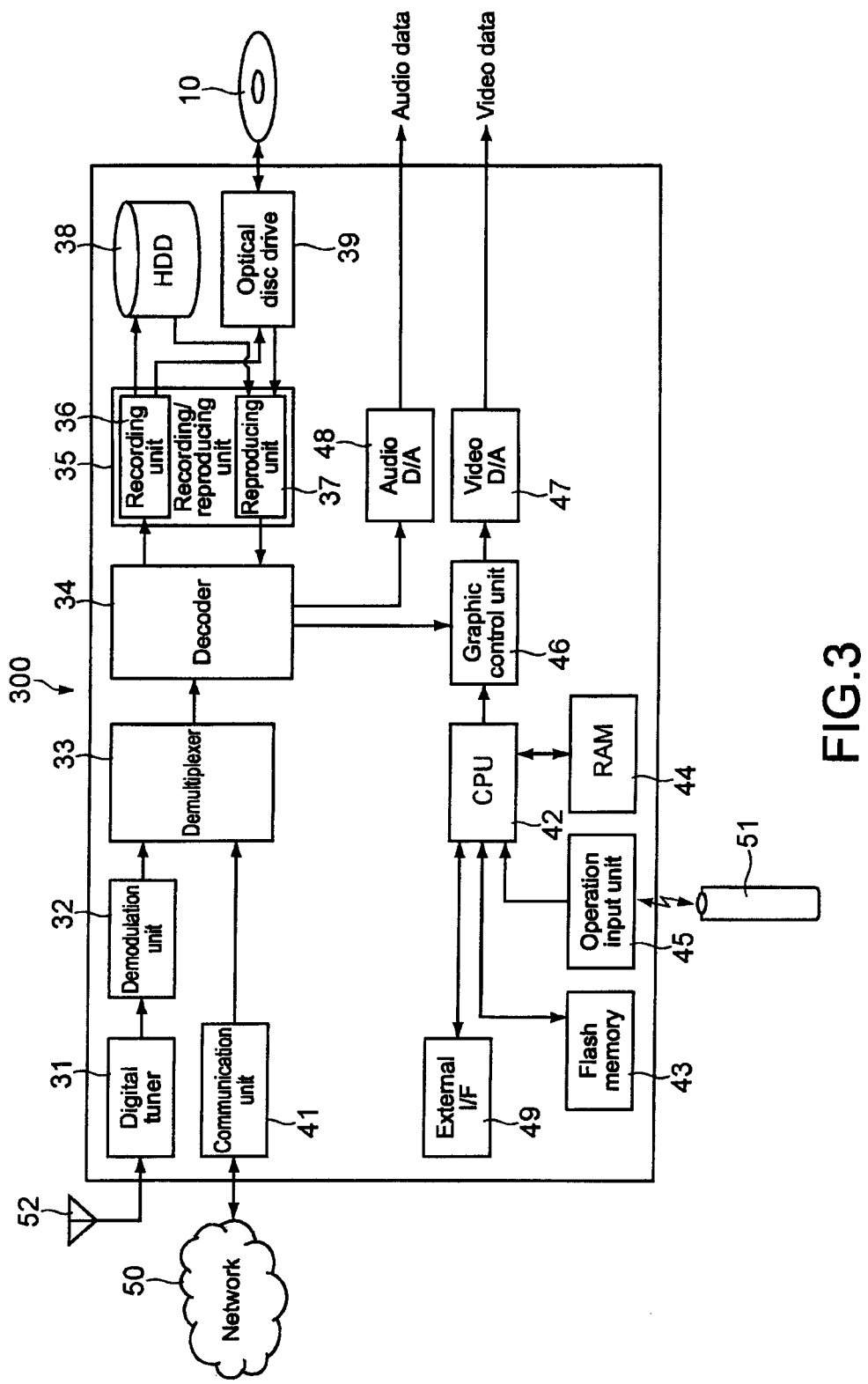
FIG. 3 is a view showing a hardware configuration of a PVR having no meta-data generation function for contents in the embodiment of the present invention.

FIG. 3 is a view showing a hardware configuration of the PVR 300 having no meta-data generation function. As shown in FIG. 3, a configuration of the PVR 300 is the same as that of the PVR 100 shown in FIG. 2 except for that the PVR 300 does not include the feature extraction circuit 20 of the PVR 100. Therefore, the description of the respective blocks of the PVR 300 is omitted here. A configuration of the PVR 200 is also the same as the configuration of the PVR 300.

[Operation of Each Device in AV Network System]

Next, the description will be made of operation of each device in the AV network system, which is configured in the above-mentioned manner. In the following, the description will be made mainly of operation of the PVR 300. In the following, although the operation of the PVR 300 will be described while considering a CPU 42 of the PVR 300 as a main operating subject, the operation is performed in cooperation with a program executed under the control of other hardware and the CPU 42.

(Metadata Generation Process)

First, the description will be made of the meta-data generation process in the AV network system. In this embodiment, there are cases where the meta-data is automatically generated by default with respect to all contents stored in all devices on the network 50, and where the meta-data is generated with respect to a particular content.

Figure 4:
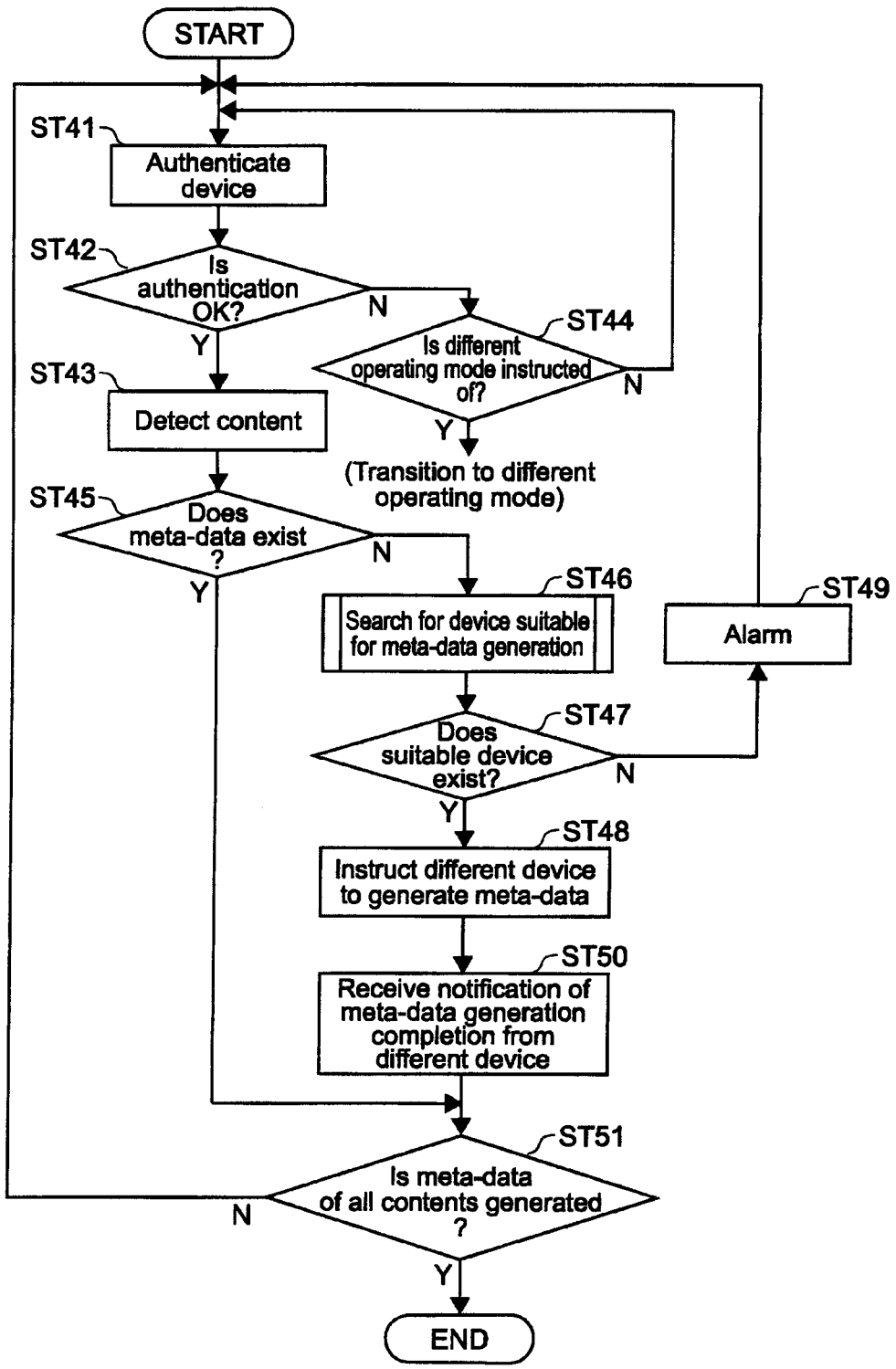
FIG. 4 is a flowchart of a meta-data generation process by default by the PVR in the embodiment of the present invention.

First, the description will be made of the case where the meta-data of the contents stored in the devices on the network 50 is generated by default. FIG. 4 is a flowchart of a meta-data generation process by default by the PVR 300.

As shown in FIG. 4, the CPU 42 of the PVR 300 tries to receive an access authentication from each of the devices on the network 50 so as to access each of the devices (Step 41). In a case where the CPU 42 is allowed to obtain the access authentication (Yes in Step 42), the CPU 42 detects a content stored in the accessed device (Step 43). In a case where the CPU 42 is not allowed to obtain the access authentication (No), that is, in a case where no accessible different device exists on the network 50, the CPU 42 determines whether or not the user provides an instruction of proceeding to a different operation mode other than the meta-data generation operation, such as content normal reproduction (Step 44). In a case where it is determined that the user provides the instruction (Yes), the CPU 42 proceeds to the different mode.

In the case where an accessible different device exists in Step 42 (Yes), the CPU 42 detects the content stored in the different device (Step 43). Then, the CPU 42 determines whether or not the meta-data is generated with respect to each of the detected contents (Step 45).

In a case where it is determined in Step 45 that the meta-data is generated (Yes), the CPU 42 determines whether or not the meta-data is generated with respect to all contents stored in all devices on the network 50, that is, whether or not a content, the meta-data of which is to be generated, still exists (Step 51). In a case where it is determined that the content, the meta-data of which is to be generated, does not exist (Yes), the process is terminated. In a case where it is determined that the content, the meta-data of which is to be generated, still exists (No), the CPU returns to Step 41 so as to repeat the above-mentioned process.

In a case where it is determined in Step 45 that the meta-data is not generated (No), the CPU 42 searches for a different device capable of generating the meta-data on the network 50 (Step 46). The details of the search process will be described later.

In a case where the different device suitable for the meta-data generation is found as the result, the above-mentioned search (Yes in Step 47), the CPU 42 issues a command to the different device, for causing the different device to generate the meta-data (Step 48). Then, the CPU 42 receives the meta-data (Step 50), the meta-data being generated in the different device in response to the command. The CPU 42 repeats the above-mentioned processes with respect to all the contents of all devices on the network 50 (Step 51).

In a case where the different device suitable for the meta-data generation is not found as the result of the above-mentioned search (No in Step 47), the CPU 42 provides, for example, through the TV 60 connected to the PVR 300, an alarm display for indicating that the meta-data is incapable of being generated (Step 49).

Figure 5:
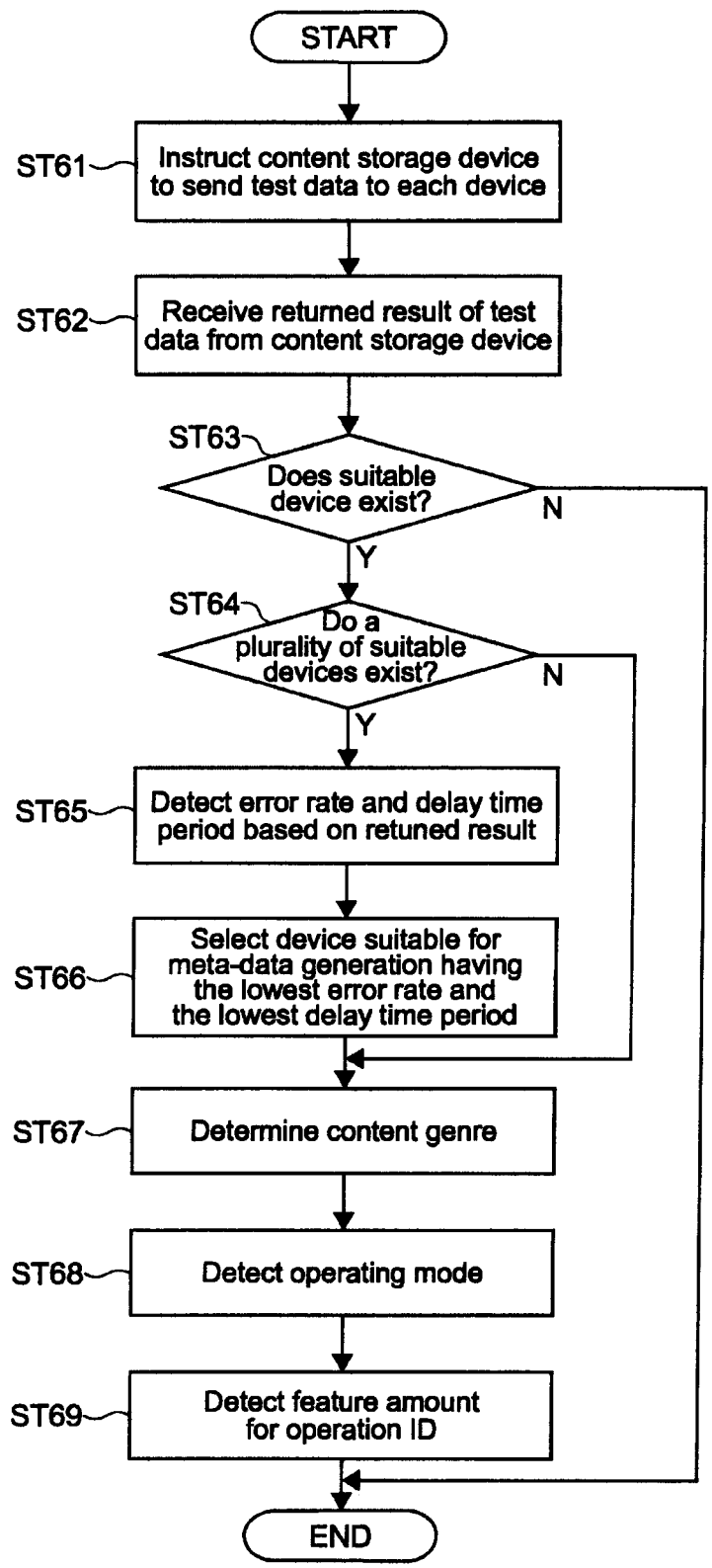
FIG. 5 is a flowchart of the details of a process in which the PVR searches for a different device capable of generating meta-data in the embodiment of the present invention.

FIG. 5 is a flowchart of the details of a process of searching for a different device capable of generating the meta-data.

As shown in FIG. 5, the CPU 42 first issues, to a different device (content storage device) for storing contents on the network 50, a command for instructing the content storage device to send test data to each different device other than the content storage device (Step 61). Here, the test data is data for inquiring whether or not the meta-data can be generated, and is, at the same time, data to be sent for searching for the best device for reliably and efficiently performing the meta-data generation process.

Subsequently, a returned result of the above-mentioned test data, which is received by the above-mentioned content storage device from each different device described above, is transferred to the CPU 42 (Step 62). Now, the description will be made of the details of the test data.

Figure 6:
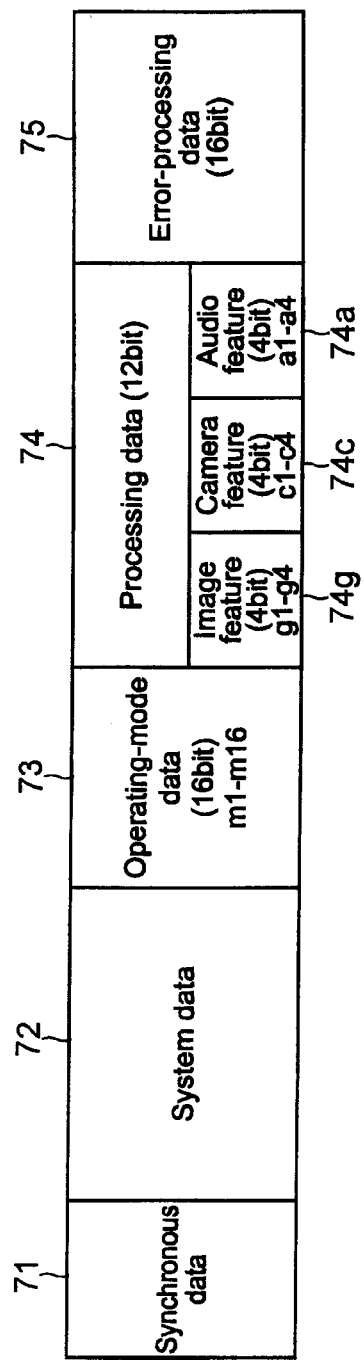
FIG. 6 is a view showing an example of a data structure of test data returned from a content storage device.

FIG. 6 is a view showing an example of a data structure of test data which is returned from the different device to a content storage device. As shown in FIG. 6, the test data includes synchronous data 71, system data 72, operation-mode data 73, processing data 74, and error-processing data 75.

The synchronous data 71 is data for synchronizing the test data, which the content storage device sends, with the test data returned from the different device. The system data 72 is data including an IP address of the different device on a returning side.

FIG. 7 is a table showing the details of the operation-mode data 73. As shown in FIG. 7, the operation-mode data 73 is composed of, for example, 16 bits (m1 to m16). There is shown with use of a bit of 0 or 1 whether or not each of a plurality of operation modes can be processed in the different device for each of 16 bits (m1 to m16). In FIG. 7, it is possible to appropriately add operation modes to positions (−) in which no operation mode is defined. As operation modes, there are exemplified a video and audio display output mode, a normal reproduction mode of the content, a digest reproduction mode of the content, an automatic editing mode of the content, a content accumulation (recording) mode, and content capture (camera function) mode. In the example shown in FIG. 7, it is shown that the different device on the returning side of the test data is suitable for all modes described above.

In the flowcharts of FIG. 4 and FIG. 5, the meta-data to be generated by the different device is predetermined, and hence whether or not the predetermined meta-data can be generated is determined based on the above-mentioned operation-mode data. For example, in a case where the meta-data for the digest reproduction is intended to be generated, it is determined whether or not the different device is suitable for the digest reproduction based on the above-mentioned operation-mode data.

FIG. 8 is a table showing the details of the processing data 74. As shown in FIG. 8, the processing data 74 is composed of, for example, 12 bits (g1 to g4, c1 to c4, a1 to a4). There is shown with use of a bit of 0 or 1 whether or not each of various video and audio feature extraction processes can be performed for each of 12 bits (g1 to g4, c1 to c4, a1 to a4). In this case, the various video and audio feature extraction processes are to be necessary in the digest reproduction mode, the automatic operation mode, and the like. In FIG. 8, it is possible to appropriately add processing functions to positions (−) in which no operation mode is defined. The processing data includes an image feature, a camera feature, and an audio feature. As the processing functions of the image feature, there are exemplified a face detection function and a ticker detection function. As the processing functions of the camera feature, there are exemplified detection functions such as zoom, pan, tilt, and hand-shake. As the processing functions of the audio feature, there are exemplified audio peak (high level) detection function, a music detection function, and a human voice detection function. In the example shown in FIG. 8, it is shown that the different device on the returning side of the test data is suitable for all processing modes described above.

The error-processing data 75 is, for example, composed of 16 bits, and is data for measuring error rate of error generated during a time period in which the test data is sent from the content storage device and is returned. Specifically, there is used, for example, an error detection code such as a CRC code or a Reed-Solomon Code.

Referring back to the flowchart of FIG. 5, when the CPU 42 receives the data of the returned result of the above-mentioned test data, the CPU 42 determines whether or not the different device (hereinafter simply also referred to as suitable device) suitable for generation of the predetermined meta-data exists (Step 63). In a case where it is determined that the suitable device does not exist (No), the CPU 42 provides the alarm display shown in Step 49 of FIG. 4.

In a case where it is determined that the suitable device exists (Yes), the CPU 42 determines whether or not a plurality of suitable devices exist (Step 64). In a case where it is determined that the plurality of suitable devices exist (Yes), the CPU 42 detects, based on the data of the returned result of the above-mentioned test data, the above-mentioned error rate and a delay time period (Step 65). The error rate is calculated based on the error-processing data in the above-mentioned returned test data. The delay time period is calculated based on a time when the content storage device sends the test data and a time when the different device returns the test data. The CPU 42 calculates the error rate and the delay time period for each of the suitable devices.

Then, the CPU 42 selects, among the plurality of suitable devices described above, a suitable device having the lowest error rate and the lowest delay time period (Step 66). That is, the CPU 42 selects the different device capable of the most efficiently and accurately performing the meta-data generation when the meta-data generation is performed. Further, the CPU 42 may perform the above-mentioned selection based on a value obtained by multiplying the error rate and the delay time period.

Subsequently, the CPU 42 determines the genre of each of the contents stored in the content storage device (Step 67). A reason for determining the genre of the content here is that the feature data, which is necessary for the automatic editing mode and the digest reproduction mode, varies depending on the genre. That is, when the genres are different among the contents, the meta-data to be generated by the different device and the operation mode to be suitable for the meta-data generation vary. Thus, the PVR 300 is adapted to appropriately select the suitable device according to the genre and the operation mode.

Now, the description will be made of a relation between the genre of the content and operation modes to be necessary for generating the meta-data of the content.

FIG. 9 is a table showing a process necessary for execution of each operation mode in a case where a content genre is a broadcast content (television content), specifically, a news program. FIG. 10 is a table showing a process necessary for execution of each operation mode in a case where the content genre is the broadcast content (television content), specifically, a sport program. FIG. 11 is a table showing a process necessary for execution of each operation mode in a case where the content genre is the broadcast content (television content), specifically, a music program. FIG. 12 is a table showing a process necessary for execution of each operation mode in a case where the content genre is a private content taken by a general user.

As shown in FIG. 9, in the case where the content genre is the broadcast content, specifically, the news program, in order to respectively perform the modes of the digest reproduction and the automatic editing, the processes of the face detection and the ticker detection among the image feature extraction processes become essential, and the human voice detection process among the audio feature extraction processes becomes essential. That is because the news program has features peculiar to the news program, the features including an image of a newscaster, tickers generally displayed in a bottom portion of the image of the newscaster, and the like. Further, in this case, the detection process for each of the camera features including the zoom, the pan, and the tilt among the camera feature extraction processes are not essential, but are necessary for higher accuracy. The detection process for each of the camera features serves to extract a characteristic scene from the video supplied from an actual news location.

As shown in FIG. 10, in the case where the content genre is the broadcast content, specifically, the sport program, in order to respectively perform the modes of the digest reproduction and the automatic editing, the face detection process among the image feature extraction processes becomes essential, the detection processes of the camera features including the zoom, the pan, and the tilt among the camera feature extraction processes become essential, and the audio peak detection process among the audio feature extraction processes becomes essential. That is because the sport program includes a feature that motions of the players and the camera become more active and a cheer is raised when scoring a goal, for example. Further, in this case, the ticker detection process among the image features is not essential, but is necessary for higher accuracy. That is because there may be a case where player information, instantly updated information of the match, and the like are displayed in tickers.

As shown in FIG. 11, in the case where the content genre is the broadcast content, specifically, the music program, in order to respectively perform the modes of the digest reproduction and the automatic editing, the face detection process among the image feature extraction processes becomes essential, and the music detection process and the human voice detection process among the audio feature extraction processes become essential. That is because, in the music program, there is a need of identifying a singer and a music which the singer sings. Further, in this case, the detection process for each of the camera features including the zoom, the pan, and the tilt among the camera feature extraction processes is not essential, but is necessary for higher accuracy. The detection process for each of the camera features serves to extract a scene in which the singer actually sings and the like.

As shown in FIG. 12, in the case where the content genre is the private content, in order to respectively perform the modes of the digest reproduction and the automatic editing, the face detection process among the image feature extraction processes becomes essential, the detection process for each of the camera features including the zoom, the pan, the tilt, and the hand-shake among the camera feature extraction processes becomes essential, the audio peak detection process and the human voice detection process among the audio feature extraction processes become essential. That is because a person, the image of which is included in the private content, and speech and behavior of the person need to be detected. Further, a hand-shake feature detection process serves to remove, when a key-frame is detected from the private content, blurred images caused by the hand-shake, which are unsuitable to be seen.

Here, in the case where the content genre is the broadcast content, the genre can be determined based on the genre information, the genre information being recorded together with the content itself according to the above-mentioned EPG information, for example, when the content is recorded in the content storage device. Meanwhile, it is possible to determine that the content is the broadcast content or the private content through detecting a hand-shake feature. That is because, when the blurred images are detected in the video of the content, the content can be determined to be the private content which is captured not by a professional, but by an ordinary user. It should be noted that, in this embodiment, the PVR 300 does not include the meta-data generation function, and hence the PVR 300 is not suitable for the above-mentioned camera feature extraction processes. Therefore, the PVR 300 requests the device (for example, PVR 100 or the like) suitable for a hand-shake feature extraction process, to determine, based on the above-mentioned returned test data, whether the content is the broadcast content or the private content. Although will be described later, the data regarding the genre of the content, which includes a determination data based on the hand-shake, is used also as the above-mentioned classification meta-data.

Further, the determination data for determining whether the content is the broadcast content or the private content may be automatically stored as a genre ID together with the genre information according to the above-mentioned EPG information when the broadcast content and the private content are recorded in the content storage device, for example. The determination with respect to whether the content is the broadcast content or the private content may be achieved through identifying a device (camcorder or the like) to be an inputting side of the private content, for example.

The different device requested of the determination process obtains, from the content storage device, a content to be determined, and extracts the hand-shake feature from the content through its hand-shake feature extraction function. Now, the description will be made of the details of the hand-shake feature extraction process.

Figure 13:
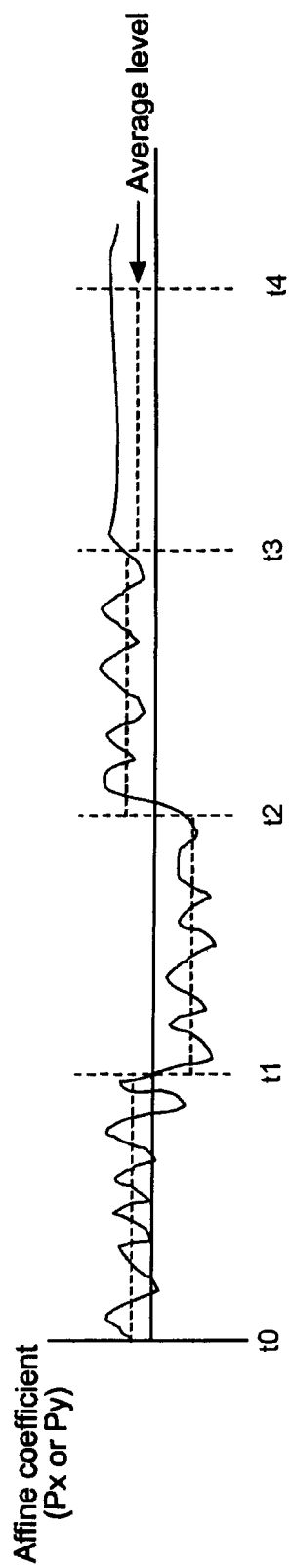
FIG. 13 is a graph conceptually showing a hand-shake feature extraction process in the embodiment of the present invention.

FIG. 13 is a graph conceptually showing the hand-shake feature extraction process. The different device requested by the PVR 300 detects a motion vector by a block matching process between a reference frame and a search frame in the content through the feature extraction circuit, and calculates, based on the motion vector, an affine coefficient by multiple linear regression analysis. Then, the different device is capable of determining, as shown in FIG. 13, the hand-shake based on dispersion of a pan coefficient Px or a tilt coefficient Py and the number of intersecting between an average value level and the pan coefficient Px or the tilt coefficient Py in each predetermined interval (t0 to t1, t1 to t2, t2 to t3, t3 to t4) in the video content. In this case, the pan coefficient Px or the tilt coefficient Py is calculated based on the affine coefficient for each predetermined interval. As the predetermined interval, a time length approximately ranging from 0.5 seconds to 5 seconds, for example, is set.

For example, in the interval t0 to t1 of FIG. 13, the coefficient Px or Py intersects the value of the average level 12 times. In the feature extraction circuit of the different device, a threshold value of the intersecting number is indicated by Thcr. In a case where the intersecting number is larger than the threshold value Thcr and each of dispersed values in the above-mentioned predetermined interval of the coefficient Px or Py are larger than a predetermined threshold value Thy, it is determined that the video in the predetermined interval includes the blurred images. Otherwise, it is determined that the video in the predetermined interval does not include the blurred images. The determination result is sent to the PVR 300 for determining whether the content is the broadcast content or the private content.

Referring back to FIG. 5, the CPU 42 detects, with use of the references shown in FIG. 9 to FIG. 12, depending on the genre determined for each of the contents, the operation mode necessary for the meta-data to be generated by the different device (Step 68). Then, the CPU 42 detects a feature amount for operation ID (g1 to g4, c1 to c4, a1 to a4 described above) which becomes essential for execution of the operation mode (Step 69).

Subsequently, the CPU 42 determines, in Step 47 of FIG. 4, whether or not the different device suitable for the process represented by the feature amount for operation ID exists, and selects the suitable device. Then, the CPU 42 issues, as described above, the command for instructing the meta-data generation to the selected device (Step 48).

The above-mentioned different device instructed of the meta-data generation receives the content, the meta-data of which is to be generated, from the content storage device.

Then, the different device executes the feature extraction process and the meta-data generation process according to the feature extraction process through the feature extraction circuit included in the different device.

Figure 14:
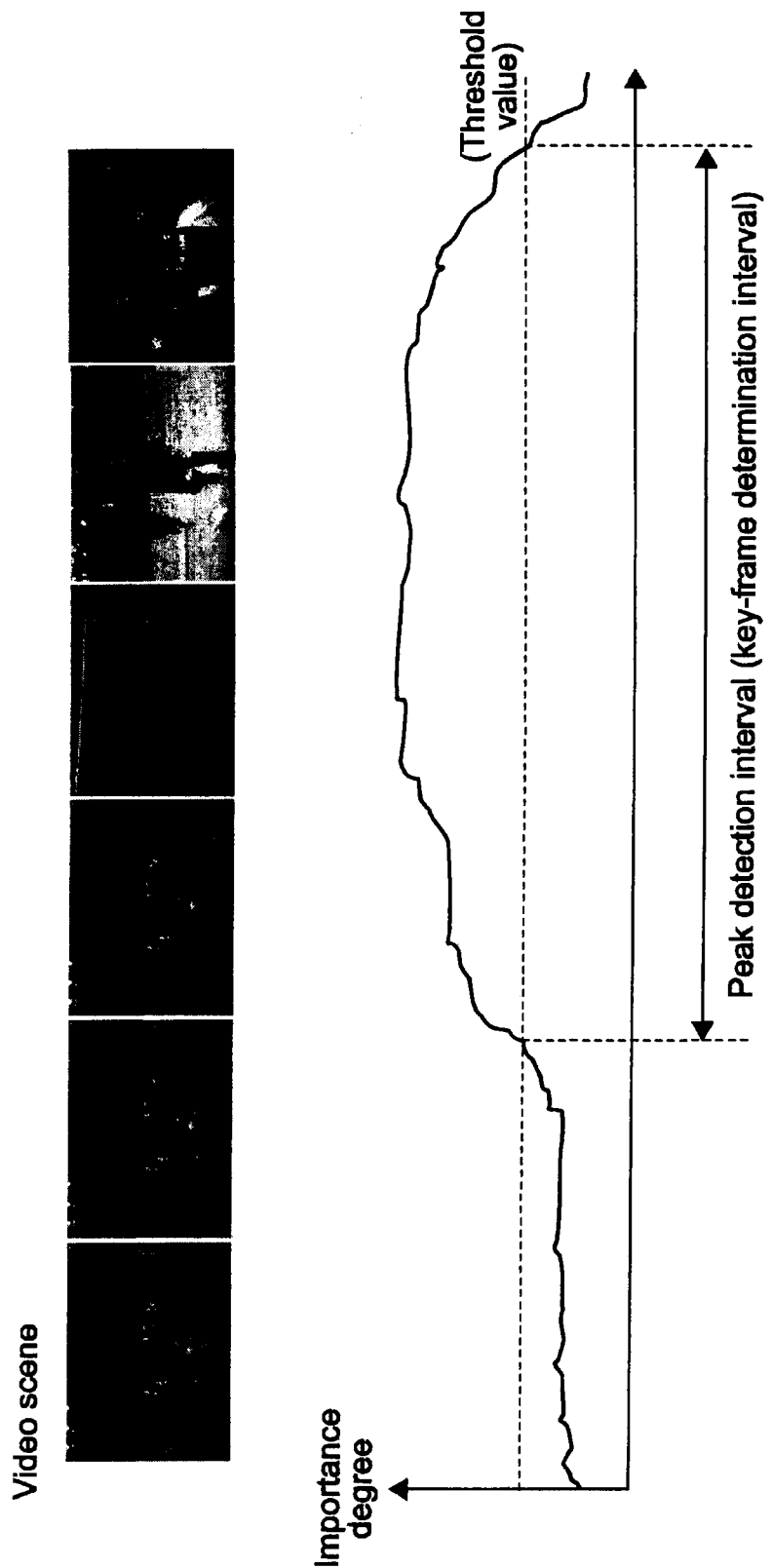
FIG. 14 is a graph conceptually showing a key-frame detection process in the embodiment of the present invention.

Now, the description will be made of the feature extraction process. FIG. 14 is a graph conceptually showing the feature extraction process. In FIG. 14, there is shown an example in which a peak scene (key-frame) is detected as the feature amount for generation of the above-mentioned scene feature meta-data, for example.

As shown in FIG. 14, the feature extraction circuit of the different device instructed of the meta-data generation subjects a video scene of a dynamic image content to the camera feature extraction process, the image feature extraction process, and the audio feature extraction process. Then, the feature extraction circuit extracts, based on the extraction result, a frame in an interval in which the feature amount equal to or larger than a predetermined threshold value is detected, as the key-frame.

A reason for extracting the key-frame based on the camera feature and the image feature is that the camera feature interval is an interval in which the user consciously operates a camera to perform capturing, and hence the interval is conceivable to be a scene having high importance degree for the user, and that the face of a person tends to be at the center of attention of the user. Further, a reason for extracting the key-frame based on the audio feature is that an attention degree of the user is conceivable to be high in an interval in which audio level is high, for example.

Specifically, the above-mentioned feature extraction circuit detects a motion vector by a block matching process between a reference frame and a search frame in the video content. Then, the feature extraction circuit calculates, based on the motion vector, an affine coefficient by multiple linear regression analysis. In this manner, the pan coefficient Px, the tilt coefficient Py, and the zoom coefficient Pz are calculated based on the affine coefficient. An interval in which the pan coefficient Px, the tilt coefficient Py, and the zoom coefficient Pz are larger than a predetermined threshold value is detected as the key-frames. Further, the feature extraction circuit extracts, with respect to the audio signal of the dynamic image content, an interval having power equal to or larger than a predetermined threshold value as the audio peak interval, for example. Then, the feature extraction circuit detects, as a key-frame of the dynamic image content, for example, an interval in which the key-frame interval extracted from the above-mentioned video scene and the audio peak interval extracted from the above-mentioned audio signal overlaps. Then, information (time code and the like) of the key-frame is generated as a scene feature meta-data.

Figure 15:
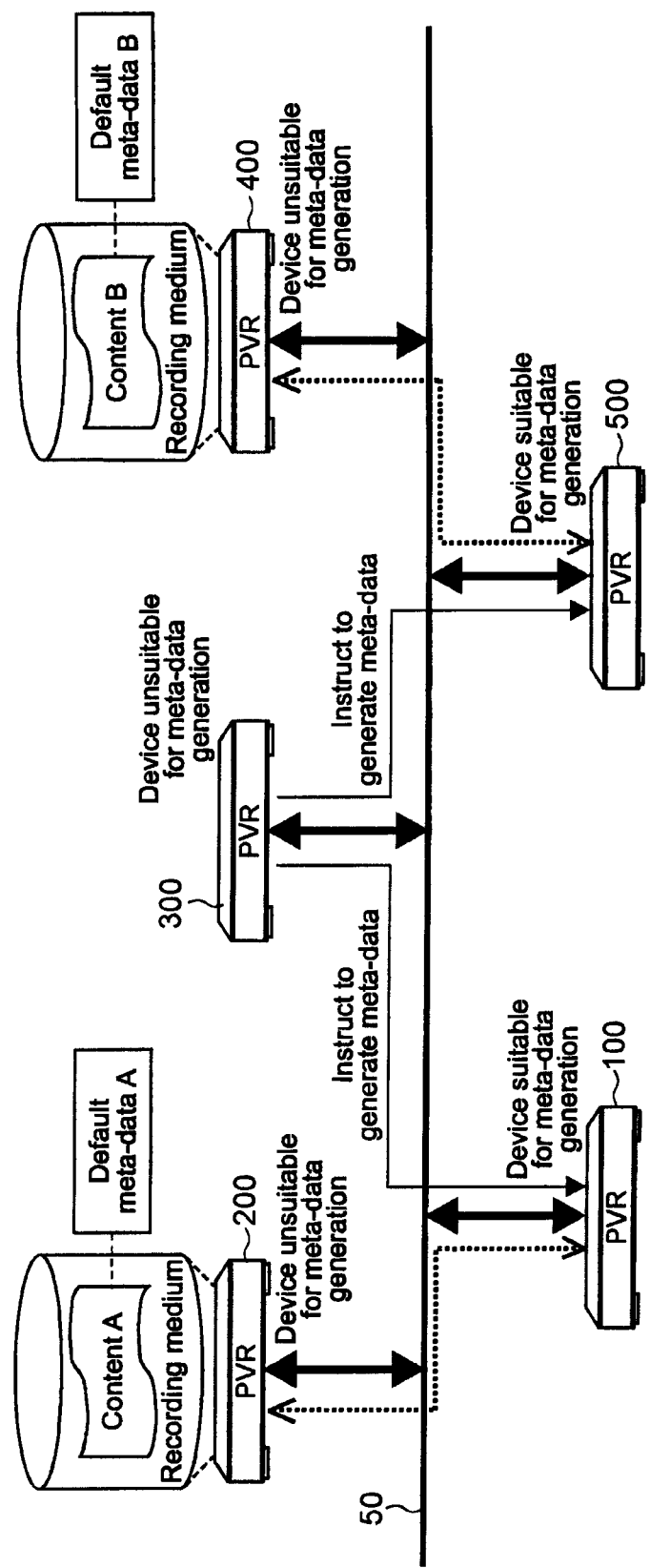
FIG. 15 is a view conceptually showing the meta-data generation process by default in the embodiment of the present invention.

FIG. 15 is a view conceptually showing the above-mentioned meta-data generation process by default. As shown in FIG. 15, for example, it is assumed that, on the network 50, PVRs 100 and 500 suitable for the meta-data generation exist, and PVRs 200, 300, and 400 unsuitable for the meta-data generation exist. Further, the PVRs 200 and 400 are the above-mentioned content storage devices. In this case, the PVR 200 stores a content A, and the PVR 300 stores a content B.

In this example, in a case where the PVR 300 unsuitable for the meta-data generation gives an instruction to generate the meta-data with respect to the content A stored in the PVR 200, the PVR 300 selects, based on the above-mentioned test data, the PVR 100 among the suitable devices to generate the meta-data, as a different device having a minimum error rate and a minimum delay time period when the meta-data is generated. As shown in FIG. 15, that is because, when the PVR 100 and the PVR 500 being the suitable devices are compared with each other, the PVR 100 is located closer to the PVR 200 being the content storage device. The generated meta-data (default meta-data A) is stored in a recording medium of the PVR 200, and is downloaded into the PVR 300 if necessary, for example, during the specific reproduction.

Similarly, in a case where the PVR 300 gives an instruction to generate the meta-data with respect to the content B stored in the PVR 400, the PVR 300 selects, based on the above-mentioned test data, the PVR 500 among the suitable devices as to generate the meta-data, as a different device having a minimum error rate and a minimum delay time period. The generated meta-data (default meta-data B) is stored in a recording medium of the PVR 400, and is downloaded into the PVR 300 if necessary.

Figure 16:
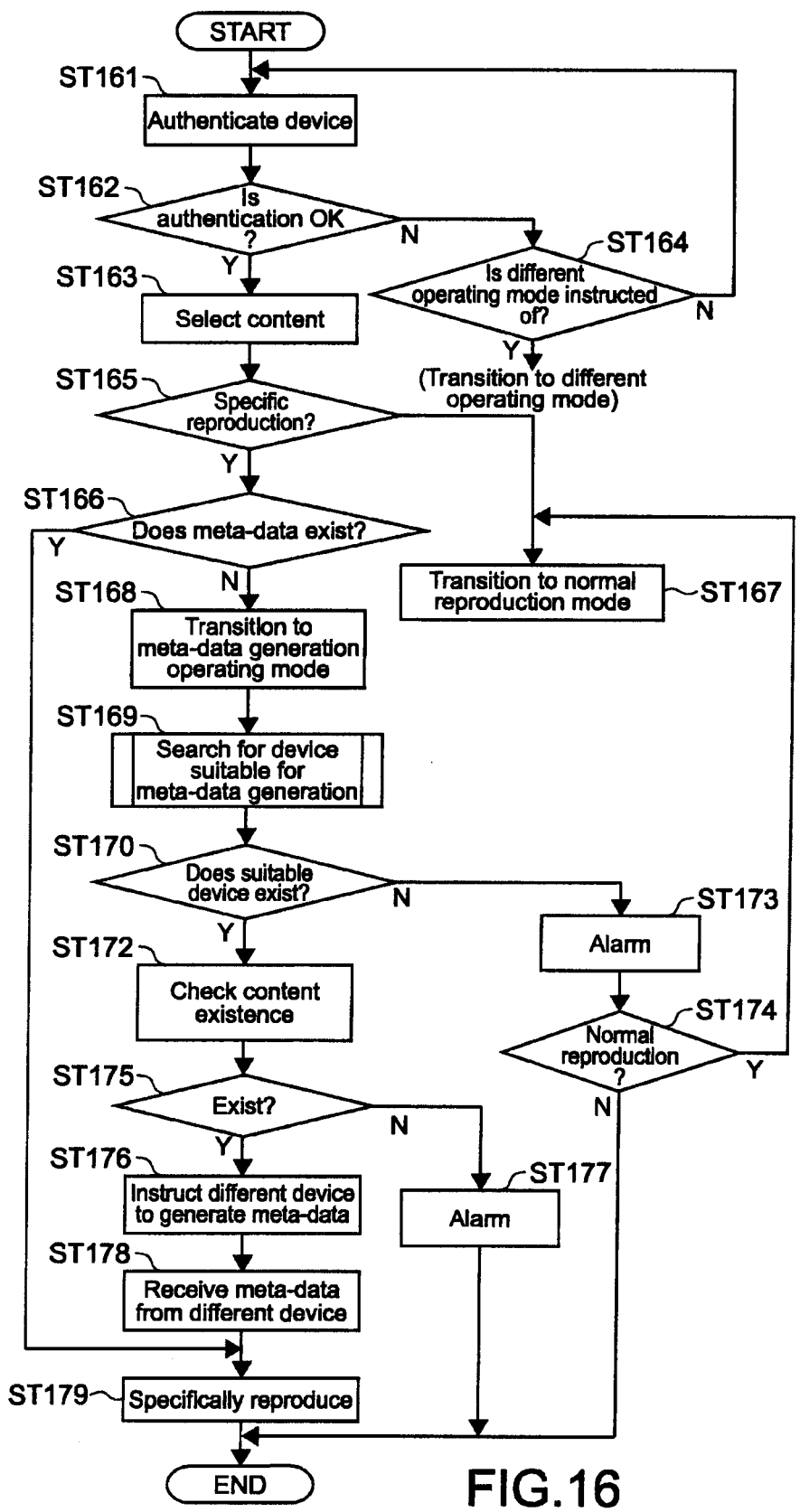
FIG. 16 is a flowchart of the meta-data generation process manually performed by the PVR in the embodiment of the present invention.

Next, the case where the meta-data is manually generated with respect to a particular content on the network 50. FIG. 16 is a flowchart of the meta-data generation process manually performed by the PVR 300. The meta-data generation process is generally performed for a content reproduction process (specific reproduction or normal reproduction).

As shown in FIG. 16, similarly to Steps 41 and 42 in the flowchart of FIG. 4, the CPU 42 of the PVR 300 tries to obtain an access authentication from the particular device on the network 50 so as to access the particular device (Step 161). In a case where the CPU 42 is allowed to obtain the access authentication (Yes in Step 162), the CPU 42 selects a particular content from contents stored in the accessed device (Step 163). In a case where the CPU 42 is not allowed to obtain the access authentication (No), the CPU 42 determines whether or not the user provides an instruction of proceeding to a different operation mode other than the content reproduction operation (Step 164). In a case where it is determined that the user provides the instruction (Yes), the CPU 42 proceeds to the different mode.

Here, the above-mentioned selection of the content is performed based on a content list displayed on the display apparatus such as the TV 60 connected to the PVR 300. The content list will be described later.

Subsequently, the CPU 42 determines according to operation by the user whether the CPU 42 performs the specific reproduction or the normal reproduction with respect to the above-mentioned selected content (Step 165). In a case where it is determined that the normal reproduction is instructed (No), the CPU 42 proceeds to a normal reproduction mode for the content, and causes the content to be normally reproduced (Step 167).

In a case where it is determined in Step 165 that the specific reproduction is instructed (Yes), the CPU 42 determines whether or not the meta-data exists with respect to the above-mentioned selected content (Step 166). In a case where it is determined that the meta-data exists (Yes), the CPU 42 receives the meta-data, and executes, based on the meta-data, the specific reproduction of the above-mentioned selected content (Step 179).

In a case where it is determined in Step 166 that no meta-data exists (No), the CPU 42 proceeds to a meta-data generation operation mode (Step 168). Then, the CPU 42 searches for, similarly to the process in FIG. 5, a device suitable for the meta-data generation with respect to the above-mentioned selected content (Step 169). In this case, in a case where a plurality of suitable devices exist, as described above, a device having a minimum error rate and a minimum delay time period is selected based on the above-mentioned test data.

In a case where the device suitable for the meta-data generation exists (Yes in Step 170), the CPU 42 checks whether or not the selected content exists at this time in the content storage device (Step 172). In the case where the selected content exists in the content storage device, the CPU 42 instructs the above-mentioned selected device of the meta-data generation (Step 178). Then, the CPU 42 receives the generated meta-data (Step 178), and executes the specific reproduction of the content with use of the meta-data (Step 179).

In a case where it is determined in Step 170 that no suitable device exists, the CPU 42 provides an alarm display as described above (Step 173), and requests, to the user, an instruction with respect to whether or not the normal reproduction of the above-mentioned content is executed (Step 174). In a case where the normal reproduction is instructed (Yes), the CPU 42 proceeds to the above-mentioned normal reproduction mode (Step 167). In a case where the normal reproduction is not instructed (No), the CPU 42 terminates the processes.

Further, in a case where it is determined in Step 175 that no content exists (No), the CPU 42 provides an alarm display for indicating that no content exists (Step 177), and terminates the processes.

Figure 17:
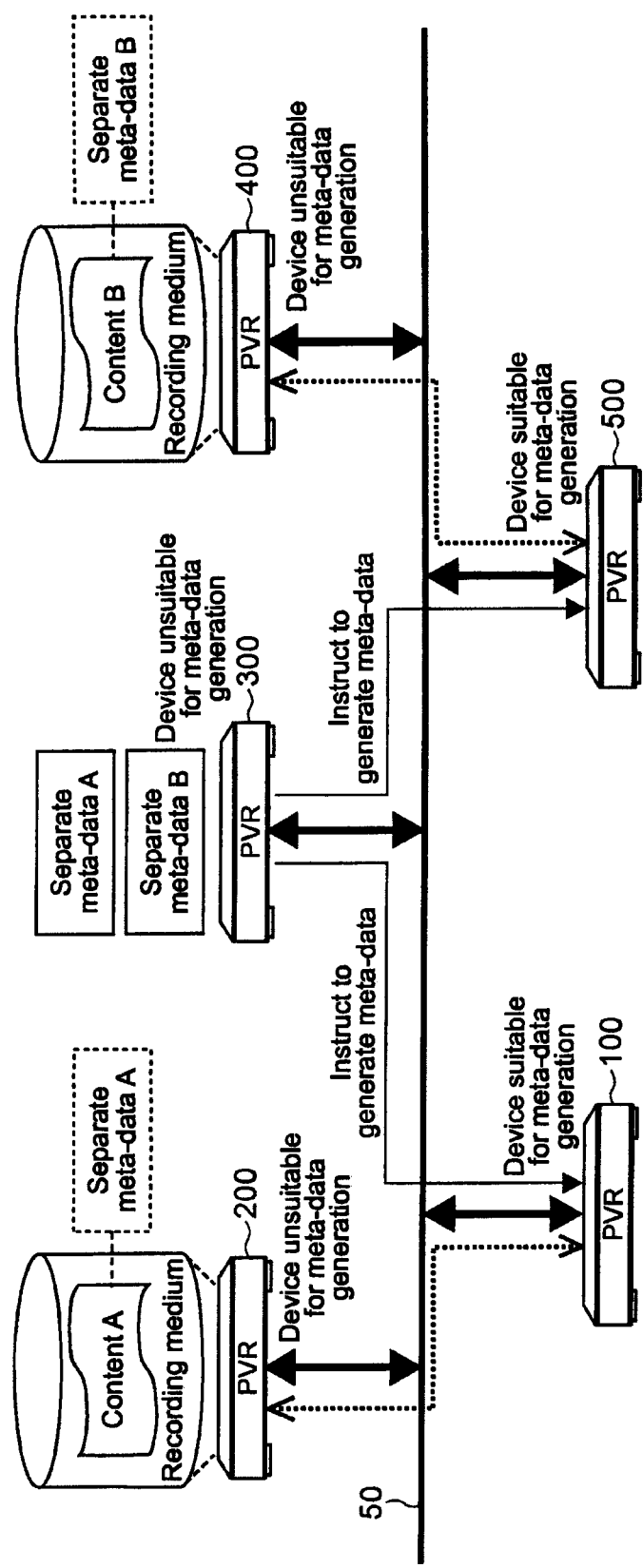
FIG. 17 is a view conceptually showing the meta-data generation process manually performed in the embodiment of the present invention.

FIG. 17 is a view conceptually showing the above-mentioned meta-data generation process manually performed. In FIG. 17, the configuration of each of the devices on the network 50 is the same as that of FIG. 15.

As shown in FIG. 17, in comparison with FIG. 15, separate meta-data A regarding the content A stored in the PVR 200 is not stored in the PVR 200, and is instead received by the PVR 300 instructing the PVR 200 to generate the meta-data. After that, the separate meta-data A is used for the specific reproduction process or the like. Similarly, separate meta-data B regarding the content B stored in the PVR 400 is not stored in the PVR 400, and is instead received by the PVR 300. After that, the separate meta-data B is used for the specific reproduction process and the like.

(Content Classification Process)

Next, the description will be made of the classification process of the contents existing in the devices on the network 50. As an assumption for the classification process of the contents, in the devices on the network 50, the above-mentioned classification meta-data is generated and stored together with the contents by the above-mentioned meta-data generation process. The classification meta-data means data regarding the genre of the above-mentioned contents. The classification meta-data is generated in advance in the above-mentioned content genre determination process in Step 67 of FIG. 5.

Figure 18:
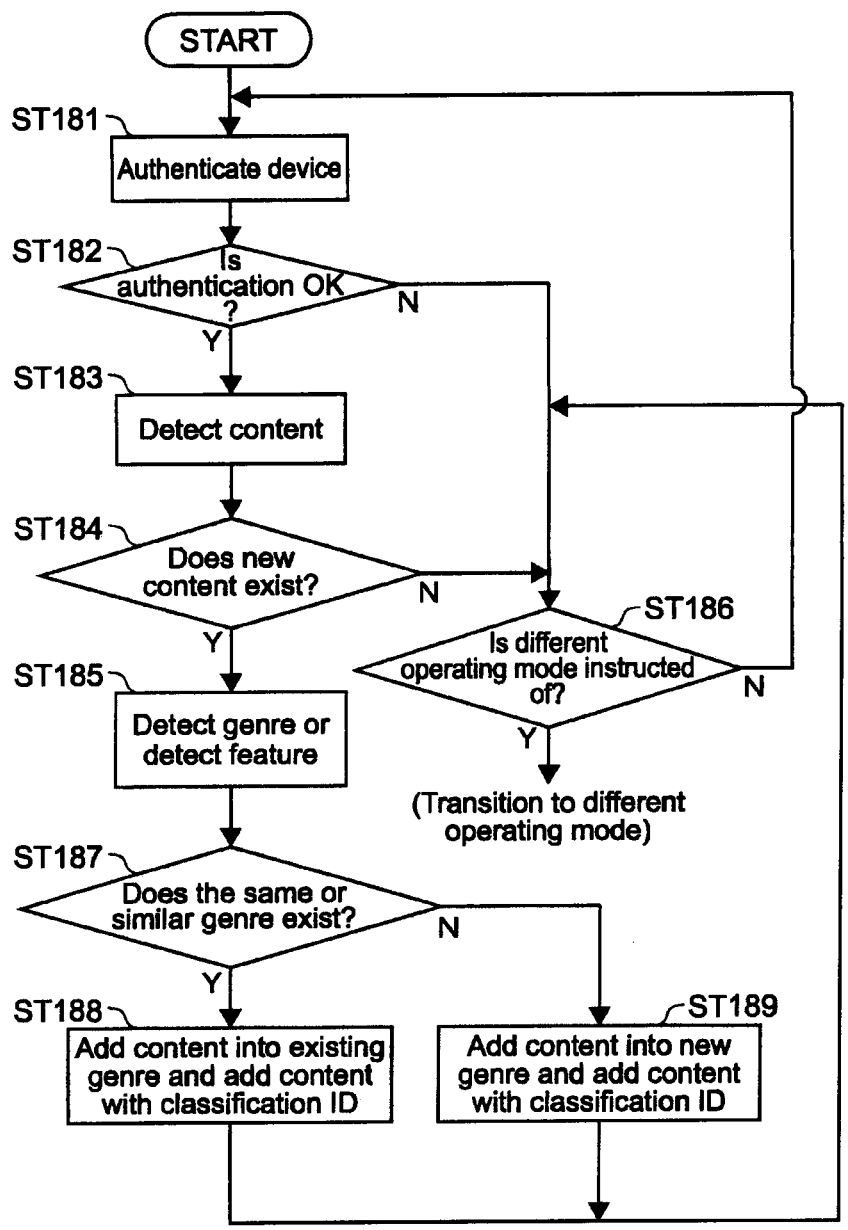
FIG. 18 is a flowchart of a content classification process in the embodiment of the present invention.

FIG. 18 is a flowchart of a content classification process by the PVR 300. As shown in FIG. 18, the CPU 42 tries to obtain an access authentication from each of the devices on the network 50 as described above (Step 181). In a case where the CPU 42 is allowed to obtain the access authentication (Yes in Step 182), the CPU 42 detects a content stored in each device (Step 183). The device itself (PVR 300) is also subjected to the above-mentioned content detection process.

In a case where the CPU 42 is not allowed to obtain the access authentication (No), the CPU 42 determines whether or not the user provides an instruction of proceeding to a different operation mode (Step 186). In a case where it is determined that the user provides the instruction (Yes), the CPU 42 proceeds to the different mode. In a case where it is determined that the user does not provide the instruction (No), the CPU 42 returns to Step 181.

When the content is detected in Step 183, the CPU 42 determines whether or not the detected content is a new content which has not yet been subjected to the classification process (Step 184). In a case where it is determined that the detected content has already been subjected to the classification process (No), the CPU 42 executes the subsequent processes after Step 186.

In a case where it is determined that the above-mentioned content is a new content which has not yet been subjected to the classification process (Yes), the CPU 42 detects, based on the above-mentioned classification meta-data, the genre of the content (Step 185). Here, in a case where the classification meta-data is not generated with respect to the above-mentioned content, the CPU 42 instructs the different device on the network 50 to generate the classification meta-data in accordance with the above-mentioned meta-data generation process. In order to generate the classification meta-data with respect to the private content, the hand-shake feature extraction process is also executed as described above.

Subsequently, the CPU 42 determines whether or not the detected genre is the same as or similar to that of a different content (Step 187). In order to determine similarity of the genre, the PVR 300 may store data of similar relations between the genres in advance.

In a case where it is determined in Step 187 that the detected genre is the same as or similar to that of the different content (Yes), the CPU 42 adds the content into the existing genre, and classification ID is added to the content (Step 188). Meanwhile, in a case where it is determined that the detected genre is not the same as or similar to that of the different content (No), the CPU 42 adds the content into a new genre, and a new classification ID is added to the content (Step 189). The classification ID includes determination data of whether the content is the private content or the broadcast content.

The CPU 42 uses the classification ID generated in the above-mentioned classification process to create the content list of the contents on the network 50, which include the contents stored in the PVR 300. In this manner, it is possible to display the content list on the display apparatus such as the TV 60.

Figure 19:
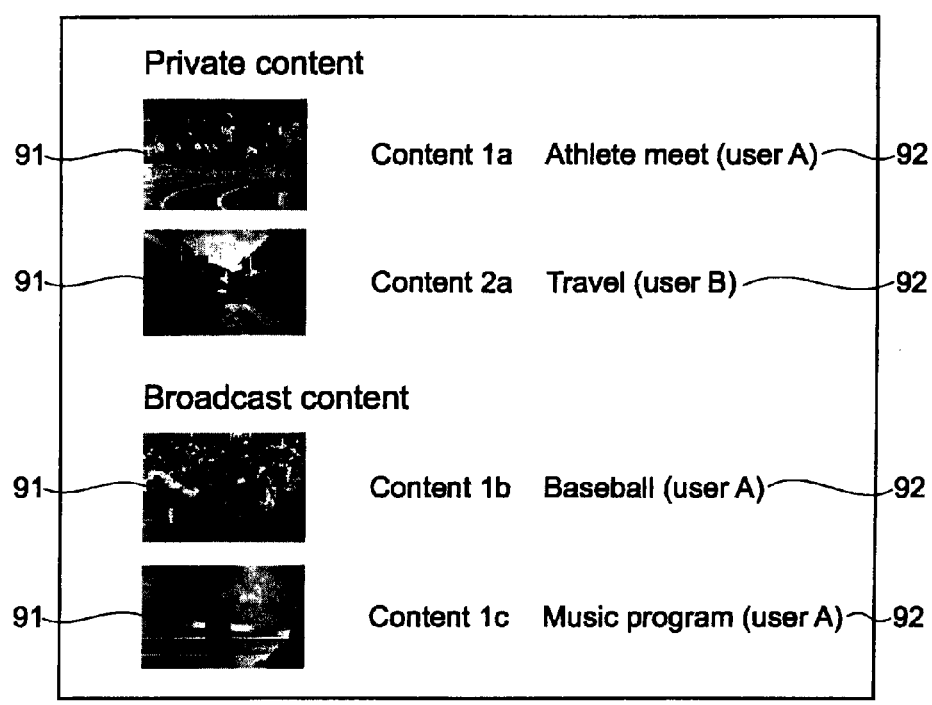
FIG. 19 is a view showing a display example of a content list generated in the embodiment of the present invention.

FIG. 19 is a view showing a display example of a content list generated as described above. As shown in FIG. 19, in the content list, the plurality of contents are classified with the above-mentioned classification IDs into the private content and the broadcast content. For each classification, a thumbnail 91 and a title 92 of the content are displayed. In this case, regarding the private content, information indicating what is captured in the content (athletic meet, travel, or the like) may be displayed. The above-mentioned information is generated, for example, according to input by the user during recording of the private content or during transferring to a different device. Further, regarding the broadcast content, the genre or sub-genre (baseball, music program, or the like) is displayed based on the above-mentioned classification ID.

When the user performs operation of selecting a particular content for reproduction in the content list, the CPU 42 receives the content from the content storage device storing the content for reproduction.

(Display Control Process for Content List, which is Performed Correspondingly to Traffic Condition and the Like)

In this case, in this embodiment, the PVR 300 is allowed to indicate, in the above-mentioned displayed content list, whether or not each content in the content list can be smoothly reproduced. That is, the PVR 300 causes the user to grasp whether or not the content can be smoothly reproduced, through changing a state of the thumbnail corresponding to the content correspondingly to the traffic condition (access state) of the network 50. In addition, in a case where a new content is added to the network 50, or in a case where there is no remaining content on the network 50, the PVR 300 is capable of causing the user to grasp the above-mentioned condition, through reflecting the condition in the content list. In the following, the description will be made of the details of the display control process.

Figure 20:
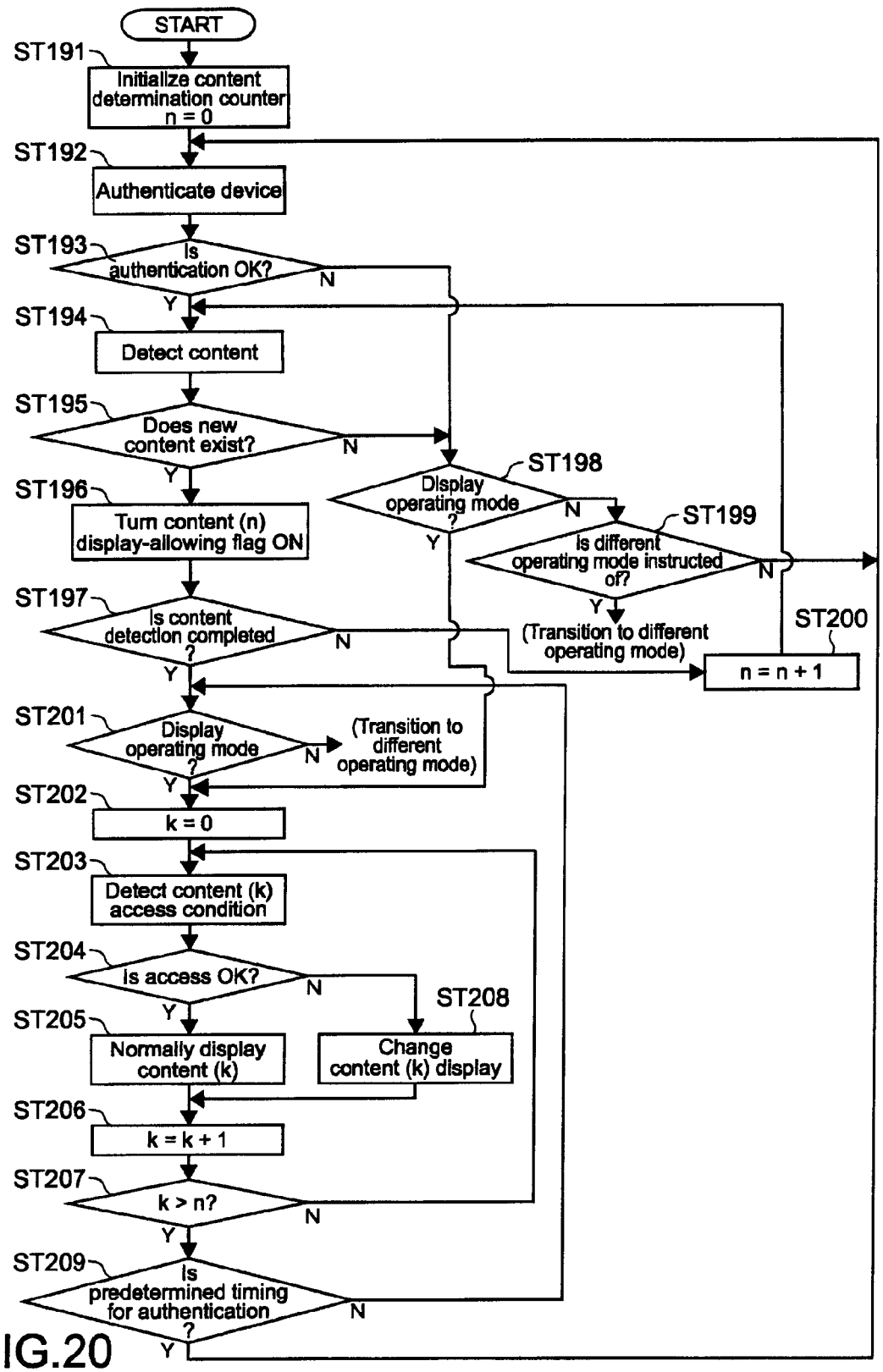
FIG. 20 is a flowchart of a display control process for the content list, which is performed correspondingly to a traffic condition and the like, in the embodiment of the present invention.

FIG. 20 is a flowchart of a display control process for the content list, which is performed correspondingly to the traffic condition and the like, in the embodiment of the present invention.

As shown in FIG. 20, the CPU 42 first initializes a counter n for determination for each of the contents so that the counter n becomes 0 (Step 191). Subsequently, the CPU 42 tries to obtain an access authentication from each of the devices on the network 50 (Step 192). In the CPU 42 is allowed to obtain the access authentication (Yes in Step 193), the CPU 42 detects a content stored in each device (Step 194). The detection of the content is executed also for the contents stored in the PVR 300 itself. Therefore, in the above-mentioned content list, all contents stored in the PVR 300 itself and the different devices are displayed. With this, the user has not to be conscious of whether the content is the content stored in the device used by the user or the content stored in one of the different devices.

In a case where the CPU 42 is not allowed to obtain the access authentication in Step 193 (No), the CPU 42 determines whether or not a display operation mode of the content list is in execution (Step 198). In a case where it is determined that the display operation mode of the content list is in execution, the CPU 42 proceeds to Step 202. In a case where the user instructs to terminate the display operation mode (No), the CPU 42 determines whether or not the user provides an instruction of proceeding to a different operation mode (Step 199). In a case where it is determined that the user provides the instruction of proceeding to the different operation mode (Yes), the CPU 42 proceeds to the different operation mode. Meanwhile, in a case where it is determined that the user does not provide the instruction of proceeding to the different operation mode (No), the CPU 42 returns to Step 192, and repeats the subsequent processes after Step 192.

When the content is detected in Step 194, the CPU 42 determines whether or not a content among the above-mentioned contents, which has not yet been subjected to the display control process for the content list, exists (Step 195). In a case where it is determined that the content, which has not yet been subjected to the display control process for the content list, exists (Yes), the CPU 42 turns a display-allowing flag ON (Step 196). In this case, the display-allowing flag indicates whether or not the above-mentioned content (n) can be displayed in the content list.

Subsequently, the CPU 42 determines whether or not all contents on the network 50 have been detected (Step 197). In a case where it is determined that the content to be detected exists (No), the CPU 42 increments the above-mentioned counter n (Step 200), and repeats the subsequent processes after Step 194.

In a case where it is determined that all contents have been detected (Yes), the CPU 42 determines whether or not the display operation mode for the content list is in execution (Step 201). In a case where it is determined that the display operation mode for the content list is in execution (Yes), the CPU 42 initializes a counter k for detecting the state of access to the content so that the counter k becomes 0 (Step 202). In Step 201, when the user instructs to terminate the above-mentioned display operation mode (No), the same process as in Step 199 is executed.

When the above-mentioned counter k is initialized, the CPU 42 detects the access state with respect to a content (k) (Step 203). That is, the CPU 42 sends the above-mentioned test data to each of the devices, receives the test data returned from each of the devices, and detects the traffic condition (error rate). In this manner, the CPU 42 estimates the error rate of the content stored in each of the devices. When the error rate is larger than a predetermined threshold value, the CPU 42 determines that the content having the above-mentioned error rate is incapable of being smoothly reproduced (incapable of being accessed).

Subsequently, with respect to the content (k) determined to be accessible, the CPU 42 gives an instruction to display the above-mentioned thumbnail thereof under a normal state in the above-mentioned content list (Step 205). In a case where it is determined that the content is incapable of being accessed (No), the CPU 42 gives an instruction to display the thumbnail thereof while the state of the thumbnail is changed (Step 208).

Subsequently, the CPU 42 increments the above-mentioned counter k, and repeats the above-mentioned processes with respect to all detected contents (contents of n-numbers) (Step 207). Then, the CPU 42 determines whether or not it is a timing when each of the devices on the network 50 is authenticated (Step 209). In a case where it is determined that it is not the timing when each of the devices on the network 50 is authenticated (No), the CPU 42 returns to Step 201. In a case where it is determined that it is the timing when each of the devices on the network 50 is authenticated (Yes), the CPU 42 returns to Step 192, and executes the authentication process.

By the above-mentioned processes, correspondingly to the traffic condition of the network 50, in a case where the content is incapable of being smoothly reproduced, the thumbnail thereof is displayed while the state of the thumbnail is changed. Further, the CPU 42 repeats the above-mentioned authentication process at a predetermined timing. In this manner, in a case where a new content is added to the network 50, it is possible to add a thumbnail thereof in the above-mentioned content list correspondingly to the above-mentioned condition. Otherwise, in a case where a certain content is eliminated from the network 50, it is possible to delete the thumbnail thereof in the above-mentioned content list correspondingly to the above-mentioned condition.

Figure 21A:
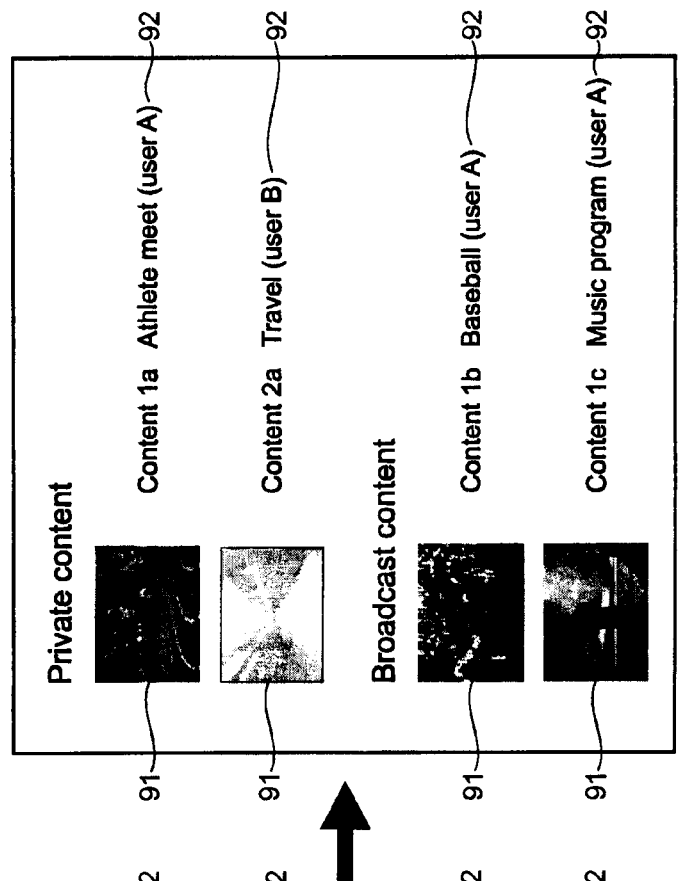
FIG. 21 are views each showing a state in which one of thumbnails is changed due to the display control process for the content list in the embodiment of the present invention.
Figure 21B:
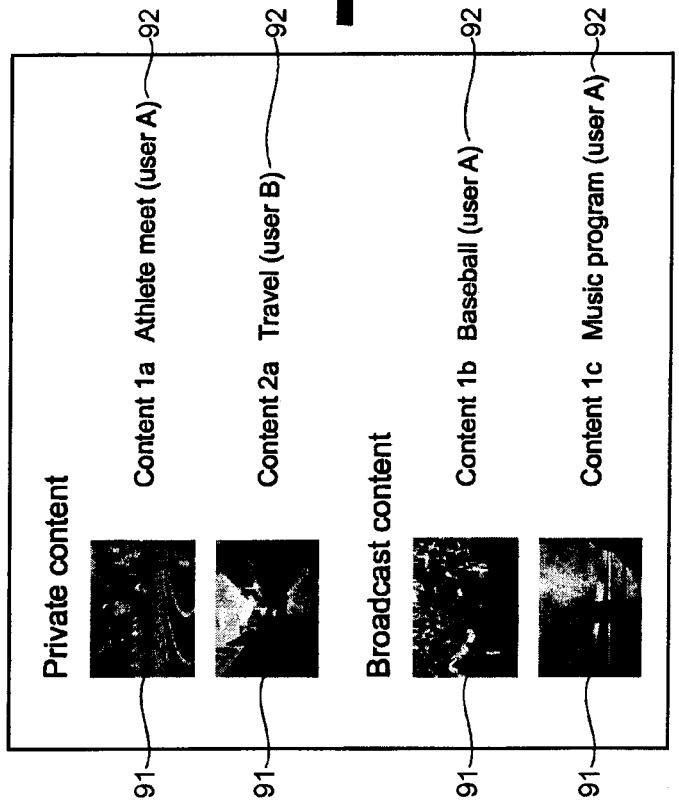

FIG. 21 are views each showing a state in which one of thumbnails is changed through the display control process for the above-mentioned content list. FIG. 21A shows the state before the state of thumbnail is changed, and FIG. 21B shows the state after the state of thumbnail is changed. As shown in FIG. 21A, a thumbnail 91 of a content 2a, which is displayed under a normal state, is displayed as a shadow (with gray color) as shown in FIG. 21B in response to the fact that the traffic condition is deteriorated or the fact that the content 2a is eliminated from the network 50. There is no limitation that the change of the display state of the thumbnail is caused by displaying the thumbnail as the shadow. For example, the change of the display state of the thumbnail may be caused by changing the intensity or the lightness of the color of the thumbnail.

Further, in the flowchart of FIG. 20, one predetermined threshold value regarding the error rate is set. However, a plurality of threshold values may be set, to thereby perform gradual display-change according to an error rate.

Further, when the above-mentioned traffic condition is improved and the error rate decreases, the CPU 42 may return the above-mentioned state of a thumbnail to the normal display state, and may display, in the vicinity of the thumbnail, a certain mark indicating the above-mentioned condition. At this time, in such a manner that a content, which the user wants to reproduce, is selected in advance in the above-mentioned content list, the CPU 42 may display only the mark regarding the selected content.

(Access Control Process Based on Face Identification Meta-Data)

In this embodiment, each of the devices on the network 50 is capable of being authenticated to access a content of the device through determining whether or not a face image of the user of the device on an access side is included in the content. That is, when a content stored in a device is accessed, this device allows the access to the content in a case where the content includes the face image of the user on the access side, or otherwise disallows the access to the content. That is based on a concept that the user should be allowed to access the content including the image of the user. In the following, the description will be made of the access control process. In the access control process, the face identification meta-data generated in the above-mentioned meta-data generation process is used.

Figure 22:
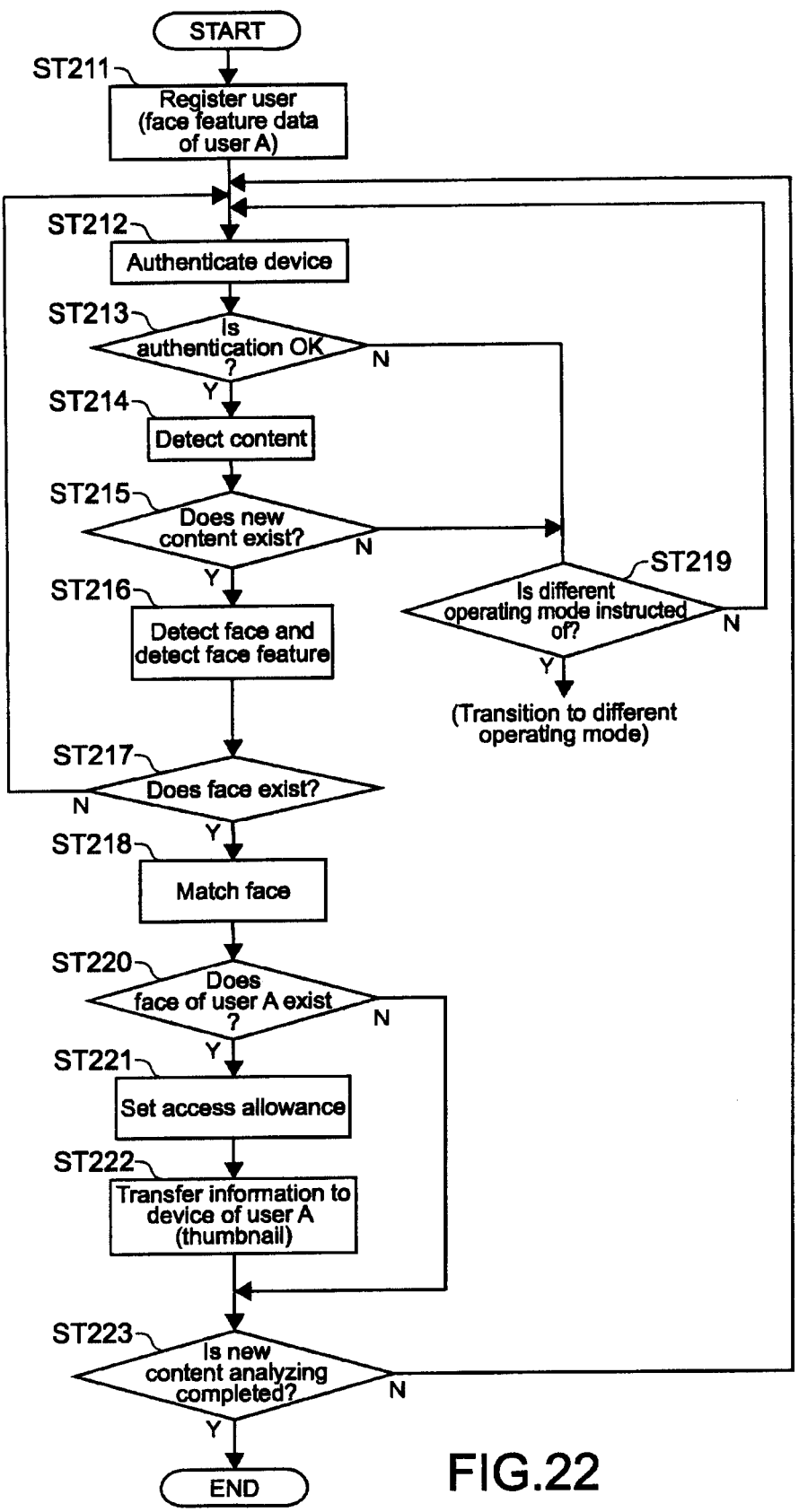
FIG. 22 is a flowchart of an access control process based on a face identification meta-data in the embodiment of the present invention.

FIG. 22 is a flowchart of an access control process based on the face identification meta-data. In FIG. 22, the description will be made of a case where the PVR 100 suitable for the above-mentioned meta-data generation process generates data indicating allowing or disallowing access with respect to all the contents on the network 50.

As shown in FIG. 22, the CPU 12 of the PVR 100 accepts, from a different device, registration of a face image of the user A of the different device (Step 211). The face image may be one captured with a camera provided to the different device, or one captured by the user A using a digital camera or a cell-phone with a camera of the user A and sent through the different device.

When the face image is registered, the CPU 12 extracts, from the face image data, face feature data (feature vector) of eyes, a nose, a mouth, a face line, a texture feature, and the like. For extraction of the face feature data, there are, for example, used a feature filter corresponding to a positional relation of each parts of the face, brightness distribution information, and skin tone information.

Subsequently, the CPU 12 tries to obtain an access authentication from each of the devices on the network 50 (Step 212). In a case where the CPU 12 is allowed to obtain the access authentication (Yes in Step 213), the CPU 12 detects a content from each of the devices (Step 214). The devices having the content to be detected also include the device itself (PVR 100). In a case where the CPU 12 is not allowed to obtain the access authentication (No), the CPU 12 determines whether or not the user of the PVR 100 provides an instruction of proceeding to a different operation mode (Step 219). In a case where it is determined that the user provides the instruction (Yes), the CPU 12 proceeds to the different mode. In a case where it is determined that the user does not provide the instruction (No), the CPU 12 returns to Step 212.

When the above-mentioned content is detected, the CPU 12 determines whether or not a content which has not yet been subjected to the access control process exists (Step 215). In a case where it is determined that no content exists, the CPU 12 proceeds to Step 219.

In a case where it is determined that the content exists, the CPU 12 detects, from the content, a face image and a face feature. For detection of the face image, there is used an existing approach such as skin tone detection. The detection of the face feature is the same as the process with respect to the above-mentioned registered face image. In this case, the detection process is unnecessary if the above-mentioned face identification meta-data is generated. In this case, the face identification meta-data can be used for the access control process as it is. In a case where the face image is not detected through the detection process (No in Step 217), the CPU 12 returns to Step 212, and repeats the processes with respect to a different device.

In a case where, in Step 216, a certain face image is detected (Yes in Step 217), the CPU 12 matches the face feature data of the above-mentioned registered face image with the face feature data detected from the above-mentioned content. In this manner, the CPU 12 determines whether or not the above-mentioned registered face image of the user A is included in the content (Step 218).

In a case where it is determined that the face image of the user A is included in the content (Yes in Step 220), the CPU 12 generates, with respect to the content, allowing data for allowing the access from the device of the user A (Step 221). Then, the CPU 12 transfers, for example, a thumbnail of the face image to the device of the user A (Step 222), the face image being detected from the content. The thumbnail may be transferred as a content list. With this, in a case where the device of the user A is held in the display operation mode, the accessible content is displayed as the content list, and hence the device of the user A is allowed to reproduce the content through immediately accessing the content in the list.

Then, the CPU 12 determines whether or not analyzing of all new contents to be subjected to the access control process has been completed (Step 223). In a case where it is determined that the analyzing has been completed (Yes), the processes are terminated. In a case where it is determined that the analyzing has not been completed (No), the CPU 12 returns to Step 212 described above, and repeats the subsequent processes after Step 212.

In the above-mentioned processes are performed in a mode in which the above-mentioned access-allowing data is automatically generated. However, the allowing data may be manually generated. FIG. 23 is a table showing a summary of the access control process respectively corresponding to the manual operation mode and the automatic operation mode.

As shown in FIG. 23, in the automatic mode, the CPU 12 automatically informs that the face, the image of which is included in the content, corresponds to the face of the user, which is registered in the device as described above. In this case, as described above, the CPU 12 transfers, for example, the above-mentioned thumbnail to a cache memory of the device of the user. Further, in the manual mode, the device on a registered side sets, according to operation of the user of the device, an operation mode for detecting whether or not the content including the image of the user exists on the network 50. In this case, after whether or not the content including the image of the user exists is detected through the above-mentioned search of the face image, the above-mentioned thumbnail is transferred to the cache memory of the device on the registered side.

In the above-mentioned processes, the access to each of the contents on the network 50 can be authenticated with the face image being used as a key. Further, authentication with more intuitiveness is allowed in comparison with a case where an ID or a password is used.

In this case, the detection process of the face image in each of the contents and the face feature data may be executed by the registered device during the registration of the content, and the detected face feature data may be stored together with the content as the meta-data. With this, each device is capable of trying the authentication immediately after an access request is provided.

Further, it is possible to allow not only the access from the user, the image of which is included in the content, but also access from a creator of the content. In this case, during recording (creating) of the content, the face feature data, which is detected from the face image of the creator of the content, is stored as the meta-data. Then, during the above-mentioned analyzing, in addition to the matching with the face feature data of the face image in the content, matching with the face feature data of the registered face image of the creator is also performed. With this, it is possible to prevent such a condition that the creator of the content is not allowed to reproduce the content created by himself/herself.

CONCLUSION

As described above, according to the above-mentioned embodiment, each device on the network 50 is allowed, even in a case where the device itself is incapable of generating meta-data, to search for a different device on the network, which is capable of generating the meta-data, and then cause the different device to generate the meta-data. In this manner, it is possible to utilize the above-mentioned meta-data for various processes.

Further, each device is capable of allowing the user to intuitively grasp whether or not the content corresponding to the thumbnail image can be smoothly reproduced, through changing the state of the thumbnail image in the content list correspondingly to the estimated error rate when the content is reproduced. Therefore, each device is capable of preventing such a condition that the user feels a feeling of discomfort caused when the user reproduces the content, which is incapable of being smoothly reproduced due to the fact that the traffic condition is bad.

In addition, in a case where a face image included in the content of each device corresponds to a face image sent from the different device, the above-mentioned device is capable of allowing access from the different device to the content even if the above-mentioned content is not created by the user of the different device.

MODIFICATIONS

The present invention is not limited to the above-mentioned embodiment, and may be variously modified without departing from the gist of the present invention.

In the above-mentioned embodiment, the example in which the PVR 300 may instruct the PVR 100 to generate the meta-data of the contents stored in the different device has been described. However, the PVR 300 may instruct the PVR 100 to generate meta-data of contents stored in the PVR 300 itself in such a manner that the PVR 300 sends and receives test data for meta-data with respect to the PVR 100.

In the above-mentioned embodiment, the case where the contents are stored in the storage device such as the HDD has been described. However, for example, the present invention is applicable also to contents stored in a portable recording medium such as a BD or a DVD.

The various meta-data is merely an example described in the above-mentioned embodiment, and the present invention is applicable to any meta-data corresponding to any operations.

In the above-mentioned embodiment, on the assumption that the content classification process is performed, the description has been made of the display change process for the thumbnails on the content list, the display change process in the content list corresponding to the traffic condition. However, it is needless to say that the above-mentioned display change process may be performed even under a state in which the content classification process is not performed.

In the above-mentioned embodiment, the example in which the present invention is applied to the PVR has been described. However, the present invention is applicable to any electronic devices including, for example, a PC (Personal Computer), a television apparatus, a gaming machine, a mobile telephone, and different AV (Audio-Visual) equipment.

The present application contains subject matter related to that disclosed in Japanese Priority Patent Application JP 2009-230000 filed in the Japan Patent Office on Oct. 1, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic device, comprising:
    at least one processor;
    a communication unit to connect to a different device on a network using the at least one processor, the different device storing accessible content;
    an output unit to connect to a display apparatus using the at least one processor;
    a control unit using the at least one processor, wherein the control unit is configured to:
        search through the communication unit for accessible content stored in the different device,
        generate a list of thumbnail images representing results of the searched accessible content,
        estimate, through the communication unit, based on traffic conditions of the network, an error rate associated with each of the searched accessible content, and
        output the list through the output unit to the display apparatus, wherein the list is outputted to comprise an indication of the level of accessibility of each item of accessible content associated with the thumbnail images in the list based on the estimated error rate;
    an operation input unit to receive, from a user, reproduction instruction operation with respect to the accessible content indicated by each of the thumbnail images using the at least one processor; and
    a reproduction unit to receive, in response to the reproduction instruction operation, the accessible content, which is subjected to the reproduction instruction operation, through the communication unit from the different device, and reproduce the accessible content using the at least one processor.

2. The electronic device according to claim 1,
    wherein the control unit updates the list through the output unit in such a manner that, when new content is stored in the different device, a thumbnail image indicating the new stored content is displayed in the list, or in such a manner that, when deleted content stored in the different device is deleted, a thumbnail image indicating the deleted content is deleted from the list.

3. The electronic device according to claim 2,
    wherein, when it is estimated that the error rate of the accessible content decreases due to improvement in the traffic condition, the control unit changes, through the output unit, the indication of the level of accessibility of each item of accessible content and causes the display apparatus to display a mark indicating the decrease of the level of accessibility in the list.

4. The electronic device according to claim 3,
    wherein the operation input unit receives, from a user, operation of selecting a content which the user wants to reproduce among the accessible content indicated by the thumbnails, and
    wherein the control unit causes the display apparatus to display the mark regarding the selected content among the accessible content for each accessible content that the level of accessibility has decreased.

5. The electronic device according to claim 2, further comprising a storage unit to store the accessible content,
    wherein the control unit generates a list including thumbnail images indicating the accessible content stored in the storage unit and the thumbnail images indicating the accessible content stored in the different device.

6. A content reproduction method, comprising:
    searching for accessible content stored in a different device on a network;
    generating a list of thumbnail images indicating the searched accessible content;
    estimating, based on traffic conditions of the network, an error rate associated with accessible content when each item of the accessible content is received and reproduced;
    outputting the list to a display apparatus, wherein the list is outputted to comprise an indication of the level of accessibility of each item of accessible content associated with the thumbnail images in the list based on the estimated error rate;
    receiving, from a user, reproduction instruction operation with respect to the accessible content indicated by each of the thumbnail images; and
    receiving, in response to the reproduction instruction operation, the accessible content, which is subjected to the reproduction instruction operation, from the different device, and reproducing the accessible content.

7. The content reproduction method according to claim 6, comprising
    updating the list such that when new content is stored in the different device, a thumbnail image indicating the newly stored content is displayed in the list, or in such a manner that, when content stored in the different device is deleted, a thumbnail image indicating the deleted content is deleted from the list.

8. The content reproduction method according to claim 7,
    wherein, when it is estimated that the error rate of the accessible content decreases due to improvement in the traffic condition, the control unit changes, through the output unit, the indication of the level of accessibility state of each item of accessible content and causes the display apparatus to display a mark indicating the decrease of the level of accessibility in the list.

9. The content reproduction method according to claim 8, comprising:
    receiving from a user an instruction to reproduce among the accessible content indicated by the thumbnails; and
    causing a display apparatus to display the mark regarding the selected content among the accessible content for each accessible content that the level of accessibility has decreased.

10. The content reproduction method according to claim 7, comprising:
    generating a list including thumbnail images indicating the accessible content and the thumbnail images indicating the accessible content stored in the different device.

11. A non-transitory computer-readable medium having embodied thereon a program, which when executed by a processor of an electronic device, causes the electronic device to perform a content reproduction method, the method comprising:

searching for accessible content stored in a different device on a network;

generating a list of thumbnail images indicating the searched accessible content;

estimating, based on traffic conditions of the network, an error rate associated with accessible content when each item of the accessible content is received and reproduced;

outputting the list to a display apparatus, wherein the list is outputted to comprise an indication of the level of accessibility of each item of accessible content associated with the thumbnail images in the list based on the estimated error rate;

receiving, from a user, reproduction instruction operation with respect to the accessible content indicated by each of the thumbnail images; and receiving, in response to the reproduction instruction operation, the accessible content, which is subjected to the reproduction instruction operation, from the different device, and reproducing the accessible content.

12. The non-transitory computer-readable medium according to claim 11, comprising:

updating the list such that when new content is stored in the different device, a thumbnail image indicating the newly stored content is displayed in the list, or in such a manner that, when content stored in the different device is deleted, a thumbnail image indicating the deleted content is deleted from the list.

13. The non-transitory computer-readable medium according to claim 12, wherein, when it is estimated that the error rate of the accessible content decreases due to improvement in the traffic condition, the control unit changes, through the output unit, the indication of the level of accessibility state of each item of accessible content and causes the display apparatus to display a mark indicating the decrease of the level of accessibility in the list.

14. The non-transitory computer-readable medium according to claim 13, comprising:

receiving from a user an instruction to reproduce among the accessible content indicated by the thumbnails; and causing a display apparatus to display the mark regarding the selected content among the accessible content for each accessible content that the level of accessibility has decreased.

15. The non-transitory computer-readable medium according to claim 12, comprising:

generating a list including thumbnail images indicating the accessible content and the thumbnail images indicating the accessible content stored in the different device.

* * * * *